(12) United States Patent
Oki et al.

(10) Patent No.: US 7,211,132 B2
(45) Date of Patent: May 1, 2007

(54) INK SET

(75) Inventors: Yasuhiro Oki, Nagano-ken (JP); Kazuhiko Kitamura, Nagano-ken (JP); Tetsuya Aoyama, Nagano-ken (JP); Masahiro Hanmura, Nagano-ken (JP); Hiroshi Fukumoto, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 215 days.

(21) Appl. No.: 10/951,442

(22) Filed: Sep. 28, 2004

(65) Prior Publication Data

US 2005/0115458 A1 Jun. 2, 2005

(30) Foreign Application Priority Data

Sep. 30, 2003 (JP) ............... 2003-340508

(51) Int. Cl.
 *C09D 11/02* (2006.01)
 *B41J 2/01* (2006.01)
(52) U.S. Cl. ............... 106/31.47; 106/31.46; 106/31.48; 106/31.49; 106/31.5; 106/31.52; 106/31.58; 106/31.59; 347/100
(58) Field of Classification Search ............. 106/31.47, 106/31.46, 31.48, 31.49, 31.5, 31.52, 31.58, 106/31.59; 347/100; 428/195.1
See application file for complete search history.

(56) References Cited

U.S. PATENT DOCUMENTS 5,948,154 A * 9/1999 Hayashi et al. .......... 106/31.48

(Continued)

FOREIGN PATENT DOCUMENTS

JP 2001-290559 10/2000

(Continued)

OTHER PUBLICATIONS

Patent Abstracts of Japan and Japanese Patent Office English translation of JP 2000-290559 dated Oct. 17, 2000.

(Continued)

*Primary Examiner*—Helene Klemanski
(74) *Attorney, Agent, or Firm*—Ladas and Parry LLP

(57) ABSTRACT

To provide an ink set capable of recording images with good ozone fastness on a recording medium, an ink set of the present invention comprises at least a yellow ink composition, a magenta ink composition, and a cyan ink composition. The cyan ink composition contains at least one of the compounds expressed by formula (1) below as a cyan dye:

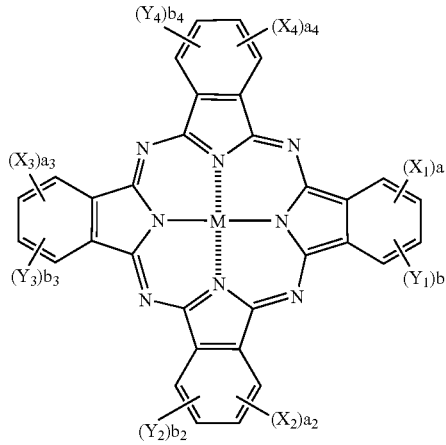

and the magenta ink composition contains, as a colorant, at least one substance selected from the group consisting of compounds expressed by formula (2) below:

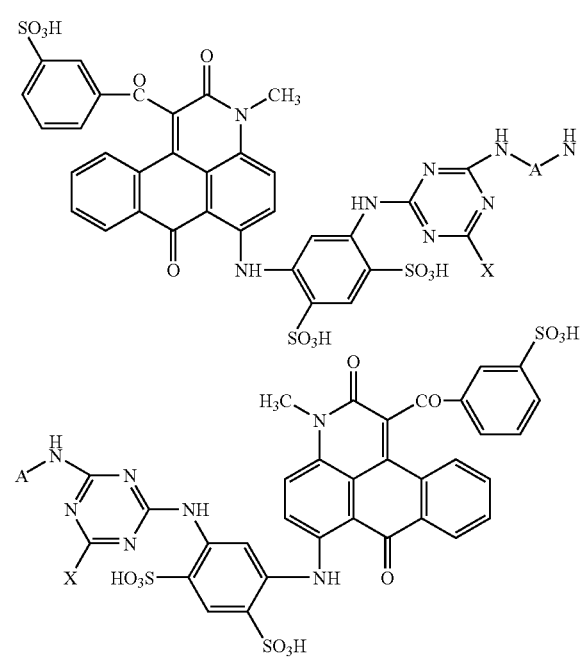

and salts thereof
(in formula (2), A represents an alkylene group, an alkylene group containing a phenylene group, or a group expressed by formula (3) below:

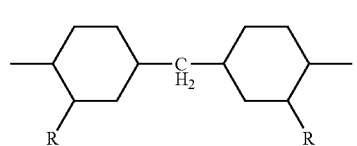

(R represents hydrogen or an alkyl group.)

and X represents a group selected from the group consisting of $NH_2$, OH, and Cl).

35 Claims, No Drawings

U.S. PATENT DOCUMENTS

| | | | |
|---|---|---|---|
| 6,454,844 B1 * | 9/2002 | Kanaya | 106/31.48 |
| 6,471,760 B1 * | 10/2002 | Matsumoto et al. | 106/31.47 |
| 6,482,256 B1 * | 11/2002 | Kanaya et al. | 106/31.51 |
| 6,852,154 B2 * | 2/2005 | Kitamura et al. | 106/31.47 |
| 6,929,361 B2 * | 8/2005 | Matsumoto et al. | 347/100 |
| 6,984,032 B2 * | 1/2006 | Kitamura et al. | 347/100 |
| 7,015,327 B2 * | 3/2006 | Matsumoto et al. | 546/76 |
| 7,077,894 B2 * | 7/2006 | Taguchi et al. | 106/31.43 |
| 7,083,669 B2 * | 8/2006 | Fukumoto et al. | 106/31.49 |
| 7,094,279 B2 * | 8/2006 | Hanmura et al. | 106/31.46 |
| 7,094,281 B2 * | 8/2006 | Hanmura et al. | 106/31.52 |
| 2003/0070580 A1 * | 4/2003 | Blease et al. | 106/31.27 |
| 2004/0239739 A1 * | 12/2004 | Matsumoto et al. | 347/100 |
| 2005/0115459 A1 * | 6/2005 | Hanmura et al. | 106/31.47 |

FOREIGN PATENT DOCUMENTS

| | | |
|---|---|---|
| JP | 2001-288392 | 10/2001 |
| JP | 2002-371214 | 12/2002 |
| JP | 2003-192930 | 7/2003 |
| JP | 2003-231835 | 8/2003 |
| JP | 2003-231844 | 8/2003 |
| WO | 02/060994 | 8/2002 |

OTHER PUBLICATIONS

Patent Abstracts of Japan and Japanese Patent Office English translation of JP 2001-288392 dated Oct. 16, 2001.

Patent Abstracts of Japan and Japanese Patent Office English translation of JP 2002-371214 dated Dec. 26, 2002.

English Abstract of WO 02/060994 dated Aug. 8, 2002.

Patent Abstracts of Japan of 2003-231844 dated Aug. 19, 2003.

Patent Abstracts of Japan of 2003-231835 dated Aug. 19, 2003.

Patent Abstracts of Japan of 2003-192930 dated Jul. 9, 2003.

Patent Abstracts of Japan and Japanese Patent Office English Translation of JP 2001-288392 dated Oct. 10, 2001.

* cited by examiner

INK SET

BACKGROUND OF THE INVENTION

1. Field of the Invention

The present invention relates to an ink set, particularly to an ink set capable of forming images with excellent ozone fastness.

2. Description of Prior Art

In recent years inkjet recording methods have been receiving attention. An inkjet recording method is a printing method whereby ink compositions are jetted as droplets and adhered to a recording medium such as paper. The method has the advantage that, with relatively inexpensive apparatus, high-resolution and high-quality images can be printed at high speed. Ink-jet recording apparatuses employing this method have gained wide market acceptance for their excellent print quality, low cost, relatively quiet performance and excellent graphic-forming capability. Among such inkjet recording apparatuses, a thermal (Bubble Jet (registered trademark)) printer and a piezoelectric drop-on-demand printer, in particular, have been commercially successful and widely used as printers for personal computers in the office and home.

In recent years, a plurality of color ink compositions have been used in inkjet recording methods to form color images and obtain recorded matters. Generally, color images are formed with three colors of ink compositions, yellow, magenta, and cyan or, if desired, four colors including a black ink composition. There are cases where color images are formed with six colors of ink compositions including a light cyan ink composition and a light magenta ink composition, or seven colors by adding a dark yellow ink composition. An ink set is a combination of two or more ink compositions.

In addition to having good coloring properties, it is desirable that the respective ink compositions for forming color images form favorable neutral colors when two or more ink compositions are combined, and cause no discoloration or fading in color of the obtained recorded matters during storage.

In the field of "photo quality" printing using color inkjet printers, improvements have been constantly made to inkjet heads, ink compositions, recording methods and media, and accordingly, the "photo" level has been reached, with images as good in quality as "silver halide photos" being obtained. Moreover, as the ink compositions and the media have been improved, attempts have also been made to enhance the storage stability of the images of the recorded matters obtained by using color inkjet printers. Light fastness of the images, in particular, has been improved to a practical level (for example, see Japanese Patent Laid-Open Publications 2000-290559 and 2001-288392). However, an image does not deteriorate only due to the effect of light, but also due to oxidation caused by oxidizing gases in the environment (for example, ozone), which further escalates fading and discoloration of the images. Accordingly, in order to further enhance storage stability, enhancement of the ozone fastness as well as the light fastness of the image formed with ink compositions on the recorded matter is desired. For that purpose, various studies have been conducted to enhance the ozone fastness of inkjet recorded matters, especially the ozone fastness of colorants (coloring materials) used in ink compositions (for example, see International Publication WO02/060994 and Japanese Patent Laid-Open Publication 2002-371214).

When the ozone fastness of a certain ink composition is remarkably inferior to that of the other ink compositions, colors formed with that certain ink composition fade or change earlier than the other colors, and the color tones of the entire image become unbalanced. As a result, an observer notices the quality deterioration of the image earlier than he or she would notice the color fading of an image formed solely with a single ink composition. Accordingly, in addition to enhancing the ozone fastness of the respective ink compositions constituting an ink set, it is desirable to equalize as much as possible the ozone fastness levels among the respective ink compositions, that is, to have the ozone-caused deterioration rates (for example, color fading rates) preferably as similar as possible between images formed with each respective ink composition. In other words, it is preferable that the respective ink compositions constituting the ink set have excellent ozone fastness and, at the same time, there is little difference in ozone fastness between them.

When an ink set includes two types, dark and light, of ink compositions of different color densities for the same color, images can be formed with various color densities with no granularity. Ink sets including two types of ink compositions of different color densities are mainly used in photo printing, but in most cases with photo printing, ink compositions of low color densities are generally used so that the granularity of the images can be mitigated or eliminated. Even patterns with an optical density of approximately 1.0 used as samples in ozone fastness evaluations are formed with ink compositions of low color densities. Accordingly, it is important to improve the ozone fastness of low color density ink compositions in order to enhance the ozone fastness of photo images in recorded matters as well as the ozone fastness of the entire ink set. High color density ink compositions, on the other hand, are used for printing full-color images and graphic art patterns, so it is also necessary to improve the ozone fastness of these ink compositions.

A black ink composition is often included in an ink set because it has the important role of providing contrast in images. If a black ink composition is included in an ink set, it is necessary that the black ink composition have excellent ozone fastness, and also that the ozone-caused deterioration rate of the black ink composition be not remarkably different from that of the other ink compositions in the ink set.

As described above, it is required that the respective ink compositions constituting an ink set have good ozone fastness, that there is a good balance of ozone fastness between the ink compositions, and that some colors do not fade or change earlier than other colors when exposed to ozone. Meanwhile, because improving ozone fastness of the respective ink compositions in the ink set may sometimes causes bronzing, it becomes necessary to reduce any bronzing. Bronzing refers to a phenomenon in which, when high duty printing is conducted, printed parts look reddish and floating. This phenomenon tends to occur when solid printing (daubing printing at 100% duty) is conducted with an ink composition containing a metal phtalocyanine dye as a coloring material (colorant). Bronzing may upset the color balance of an entire image and degrade the image quality.

SUMMARY OF THE INVENTION

The present invention has been completed to achieve the above object and it relates to an ink set capable of recording images with good ozone fastness on a recording medium, an ink cartridge housing such an ink set, a recording method using the ink set, and a recorded matter recorded with the ink set.

The present ink set comprises at least a yellow ink composition, a magenta ink composition, and a cyan ink composition. The cyan ink composition contains, as a cyan dye, at least one substance selected from the group consisting of the compounds expressed by formula (1) below:

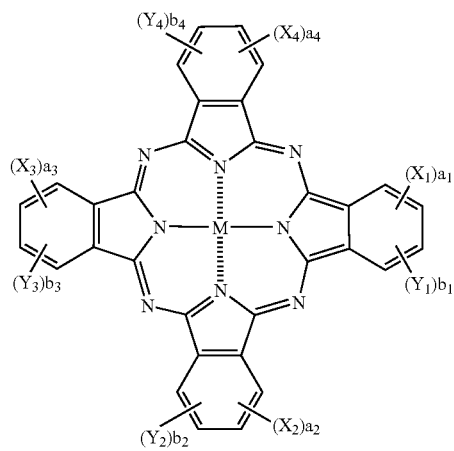

and salts thereof.

(in formula (1), each of $X_1$, $X_2$, $X_3$ and $X_4$ independently represents —SO—Z or —SO$_2$—Z. Here, each Z independently represents a substituted or non-substituted alkyl group, a substituted or non-substituted cycloalkyl group, a substituted or non-substituted alkenyl group, a substituted or non-substituted aralkyl group, a substituted or non-substituted aryl group, or a substituted or non-substituted heterocyclic group.

Each of $Y_1$, $Y_2$, $Y_3$ and $Y_4$ independently represents a hydrogen atom, a halogen atom, an alkyl group, a cycloalkyl group, an alkenyl group, an aralkyl group, an aryl group, a heterocyclic group, a cyano group, a hydroxy group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamide group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, or an ionic hydrophilic group. Each group may further have a substituent.

$a_1$ to $a_4$ and $b_1$ to $b_4$ represent the number of substituents of $X_1$ to $X_4$ and $Y_1$ to $Y_4$ respectively. Each of $a_1$ to $a_4$ independently represents an integer 0 to 4, but all of them cannot be 0 at the same time. Each of $b_1$ to $b_4$ independently represents an integer of 0 to 4.

M represents a hydrogen atom, a metal atom or an oxide thereof, a hydroxide, or a halide.

However, at least one of $X_1$, $X_2$, $X_3$, $X_4$, $Y_1$, $Y_2$, $Y_3$, and $Y_4$ is an ionic hydrophilic group or a group having an ionic hydrophilic group as a substituent.)

The magenta ink composition contains, as a colorant, at least one substance selected from the group consisting of the compounds expressed by formula (2) below:

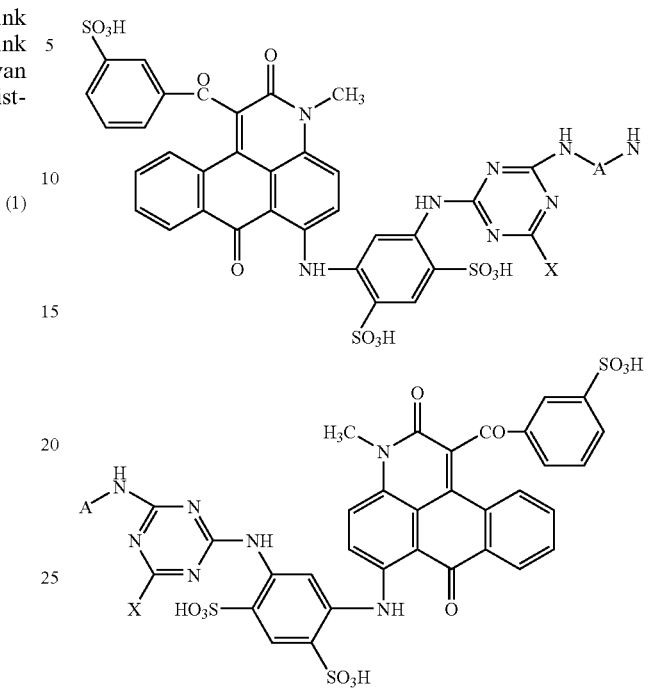

and salts thereof.

(In formula (2), A represents an alkylene group, an alkylene group containing a phenylene group, or a group expressed by formula (3) below:

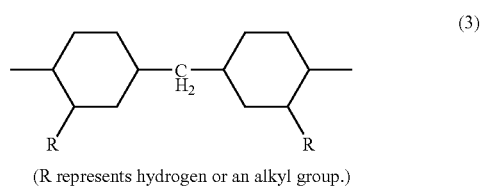

(R represents hydrogen or an alkyl group.)

and X represents a group selected from the group consisting of $NH_2$, OH and Cl.)

With respect to the compound expressed by formula (1) and included in the present ink set, it is preferable that M represents a copper atom; each of $X_1$, $X_2$, $X_3$ and $X_4$ represents —SO$_2$Z; Z represents $R^5$ ($R^5$ represents —(CH$_2$)$_3$SO$_3$M$^2$ and here M$^2$ represents an alkaline metal atom) and/or $R^6$ ($R^6$ represents —(CH$_2$)$_3$SO$_2$NHCH$_2$CH (OH)CH$_3$); each of $Y_1$, $Y_2$, $Y_3$ and $Y_4$ represents a hydrogen atom; each of $a_1$, $a_2$, $a_3$, and $a_4$ is 0 or 1 and two or more of $a_1$, $a_2$, $a_3$ and $a_4$ are 1; and each of $b_1$, $b_2$, $b_3$, and $b_4$ is an integer that results in a sum of 4 when added to $a_1$, $a_2$, $a_3$, and $a_4$ respectively.

In the present ink set described above, $M^2$ preferably represents Li.

In the present ink set, it is preferable that the cyan dye, in a preferable state of the compounds expressed by formula (1), be a mixture of tetrasulfonate, trisulfonate, and disulfonate in which each "Z" is independently selected from $R^5$ or $R^6$ and the molar ratio of $R^5$ and $R^6$ contained in the entire cyan dye is $R^5/R^6=3/1$.

The cyan ink composition in the present ink set preferably contains, as a colorant, at least one substance selected from the group consisting of the compounds expressed by formula (1) and salts thereof, and the total amount of the colorant is preferably 1.0 to 10 wt % of the entire cyan ink composition.

The magenta ink composition preferably contains, as a colorant, at least one substance selected from the group consisting of the compounds expressed by formula (2) and salts thereof, and the total amount of the colorant is preferably 2.0 to 10.0 wt % of the entire magenta ink composition.

In the above ink set, the magenta ink composition preferably contains, as a colorant, at least one substance selected from the group consisting of the compounds expressed by formula (4) below:

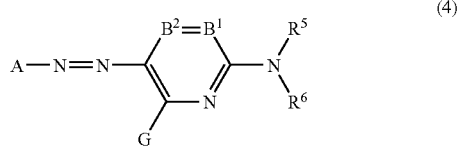

(4)

and salts thereof.

(in formula (4), A represents a residue of a five-member heterocyclic diazo component A-$NH_2$. $B^1$ and $B^2$ represent —$CR^1$= and —$CR^2$= respectively, or one of them represents a nitrogen atom and the other represents —$CR^1$= or —$CR^2$=. Each of $R^5$ and $R^6$ independently represents a hydrogen atom, an alkyl group, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, an arylsulfonyl group, or a sulfamoyl group. Each group may further comprise a substituent. Each of G, $R^1$, and $R^2$ independently represents a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted by an alkyl group, an aryl group or a heterocyclic group, an acylamino group, a ureide group, a sulfamoylamino group, an alkoxycarbonylamino group, an aryloxycarbonylamino group, an alkyl and arylsulfonylamino group, a nitro group, an alkyl and arylthio group, an alkyl and arylsulfonyl group, an alkyl and arylsulfynyl group, a sulfamoyl group, a sulfo group, or a heterocyclic thio group. Each group may further be substituted. $R^1$ and $R^5$, or $R^5$ and $R^6$ may be bonded to form a five to six-member ring).

The present ink set preferably comprises, as a cyan ink composition, two types of cyan ink compositions of different color densities and at least one of the cyan ink compositions preferably contains at least one substance selected from the group consisting of the compounds expressed by formula (1) and salts thereof.

Of the two cyan ink compositions of different color densities included in the present ink set, the low color density cyan ink composition preferably contains, as a colorant, at least one substance selected from the group consisting of the compounds expressed by formula (1) and salts thereof, and the total amount of the colorant is preferably 0.4 to 3.0 wt % of the entire low color density cyan ink composition.

Of the two types of cyan ink compositions of different color densities included in the present invention, the high color density cyan ink composition preferably contains, as a colorant, at least one substance selected from the group consisting of the compounds expressed by formula (1) and salts thereof, and the total amount of the colorant is preferably 2.0 to 10.0 wt % of the entire high color density cyan ink composition.

Regarding the two types of cyan ink compositions of different color densities in the present ink set, the ratio of the density (wt %) of the colorant contained in the low color density cyan ink composition to the density (wt %) of the colorant contained in the high color density cyan ink composition is preferably in the range of 1:2 to 1:8.

The cyan ink composition in the present ink set preferably contains at least one substance selected from the group consisting of naphthalene-based aromatic compounds having a carboxyl group at the second position and salts thereof.

In the cyan ink compositions in the present ink set, the salt of the naphthalene-based aromatic compounds having a carboxyl group at the second position is preferably lithium salt.

The present ink set preferably comprises, as a magenta ink composition, two types of magenta ink compositions of different color densities, and at least one of the magenta ink compositions preferably has at least one substance selected from the group consisting of the compounds expressed by formula (2) and the salts thereof.

Of the two types of the magenta ink compositions of different color densities in the present ink set, the low color density magenta ink composition preferably contains, as a colorant, at least one substance selected from the group consisting of the compounds expressed by formula (2) and salts thereof, and the total amount of the colorant is preferably 0.5 to 3.5 wt % of the entire low color density magenta ink composition.

Of the two types of the magenta ink compositions of different color densities in the present ink set, the high color density magenta ink composition preferably contains, as a colorant, at least one substance selected from the group consisting of the compounds expressed by formula (2) and salts thereof, and the total amount of the colorant is preferably 3 to 10 wt % of the entire high color density magenta ink composition.

With respect to the two types of magenta ink compositions of different color densities in the present ink set, the ratio of the density (wt %) of the colorant contained in the low color density magenta ink to the density (wt %) of the colorant contained in the high color density magenta ink composition is preferably in the range of 1:2 to 1:8.

The magenta ink composition in the present ink set preferably contains at least one substance selected from the group consisting of the naphthalene-based aromatic compounds having a carboxyl group at the second position and salts thereof.

In the magenta ink composition of the present ink set, the salt of the naphthalene-based aromatic compounds having a carboxyl group at the second position is preferably lithium salt.

The yellow ink composition in the present ink set preferably contains, as a colorant, at least one substance selected from the group consisting of the compounds expressed by formula (5) below:

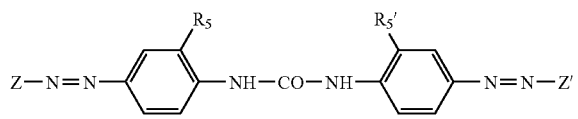

(5)

and formula (6) below:

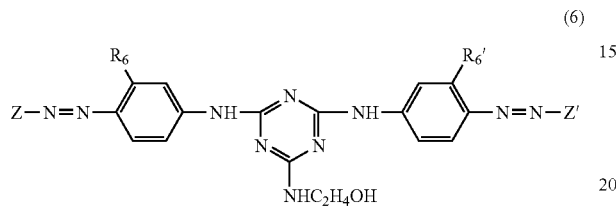

(6)

(in formula (5) and formula (6), each of $R_5$, $R_5'$, $R_6$, and $R_6'$ independently represents $CH_3$ or $OCH_3$, and each of Z and Z' independently has any of the following structures:

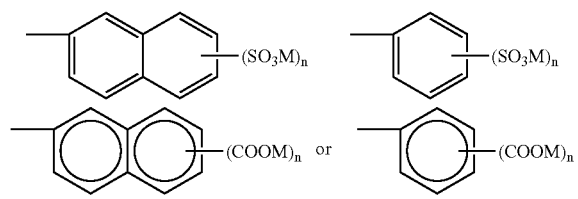

and their structures may be the same or different. Here, M represents H, Li, Na, K, ammonium, or organic amines, and n represents an integer 1 or 2.)

The yellow ink composition in the present ink set preferably contains, as a colorant, at least one substance selected from the group consisting of the compounds expressed by formula (5) and formula (6), and the total amount of the colorant is preferably 1 to 6 wt % of the entire yellow ink composition.

It is preferable that the yellow ink composition in the present ink set further contains C.I. Direct Yellow 58 as a colorant.

In the yellow ink composition in the present ink set, the ratio of the total density (wt %) of the compounds selected from the group consisting of the compounds expressed by formula (5) and formula (6) to the density (wt %) of C.I. Direct Yellow 58 is preferably in the range of 4:1 to 10:1.

It is preferable that the present ink set further comprise a black ink composition.

The black ink composition in the present ink set preferably contains, as a black dye, at least one substance selected from the group consisting of the compounds expressed by formula (7) below:

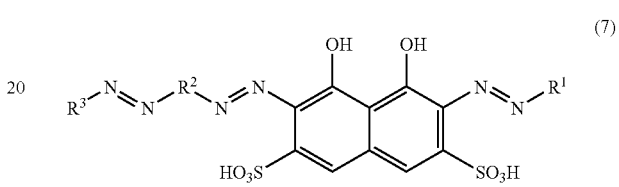

(7)

and salts thereof.

(in formula (7), $R^1$ represents a phenyl group having a substituent or a naphthyl group having a substituent, $R^2$ represents a phenylene group having a substituent or a naphthylene group having a substituent, and $R^3$ represents a five to seven-member heterocyclic group having at least one double bond and a substituent. The substituents in $R^1$ to $R^3$ are selected from the group consisting of OH, $SO_3H$, $PO_3H_2$, $CO_2H$, $NO_2$, $NH_2$, a $C_{1-4}$ alkyl group, an alkyl group having a substituent, a $C_{1-4}$ alkoxy group, an alkoxy group having a substituent, an amino group, an amino group having a substituent, and a phenyl group having a substituent.)

In the present ink set of the present invention, it is preferable that the compounds expressed by formula (7) be the compounds expressed by formula (8) below:

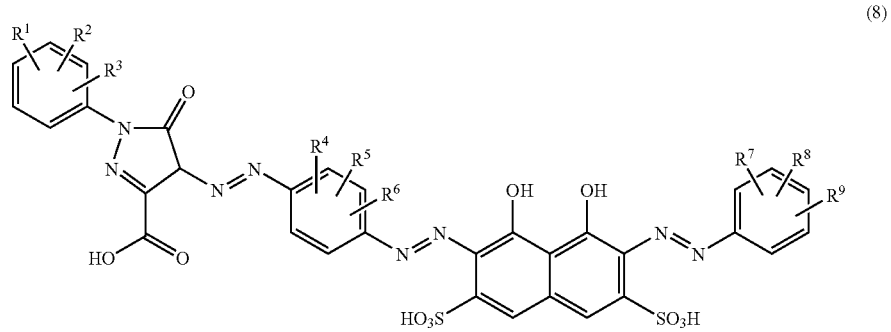

(8)

(In formula (8), each of R1 to R9 independently represents a group selected from the group consisting of H, OH, $SO_3H$, $PO_3H_2$, $CO_2H$, $NO_2$, and $NH_2$.)

The black ink composition in the present ink set preferably contains, as a colorant, at least one substance selected from the group consisting of the compounds expressed by formula (7) and salts thereof, and the total amount of the colorant is preferably 0.5 to 12 wt % of the entire black ink composition.

The ink compositions in the present ink set preferably contain a non-ionic surfactant.

The non-ionic surfactant in the present ink set is preferably an acetylene glycol-based surfactant.

In the present ink set, the ink compositions contain the non-ionic surfactant preferably in an amount of 0.1 to 5 wt %.

The ink compositions in the present ink set preferably contain a penetrating agent.

The penetrating agent in the present ink set is preferably glycol ethers.

An ink cartridge of the present invention is characterized in that it houses the present ink set integrally or separately.

An inkjet recording method of the present invention is characterized in that recording is conducted using the present ink set and the present ink cartridge described above.

Recorded matters of the present invention are characterized in that they are recorded using the ink set and the ink cartridge described above.

DESCRIPTION OF THE PREFERRED EMBODIMENTS

The inventors of the present invention composed an ink set by combining various ink compositions of multiple colors and conducted experiments in order to enhance the ozone fastness of images formed therewith. As a result they discovered that, when they used cyan and magenta ink compositions with dyes having the respective aforementioned specific structures, they could obtain an ink set where an image formed on a recorded matter had excellent ozone fastness and, owing to the small difference in ozone-caused image deterioration rate between the cyan and the magenta, even if there was a certain degree of deterioration, an observer would hardly notice.

The inventors also discovered that, when they used the dye having the aforementioned relevant specific structure as a colorant in the yellow ink composition, they could obtain an ink set where each color of yellow (Y), magenta (M), and cyan (C) had excellent ozone fastness, the differences in ozone-caused deterioration rate were reduced between the respective colors, and an observer would hardly recognize any deterioration of the entire image even if there was a certain degree of ozone-caused image deterioration present.

The inventors further discovered that when they included in the ink set a black ink composition using as a black dye the dye having the aforementioned relevant specific structure, they could obtain an ink set where an observer would hardly notice deterioration of the entire image even if ozone-caused image deterioration was present to a certain degree, because the respective ink compositions constituting the ink set had excellent ozone fastness and the differences in ozone-caused deterioration rate between the respective ink compositions were reduced.

The inventors also discovered that the occurrence of bronzing can be reduced and the moisture fastness of the recorded image can be enhanced by including, in the cyan and/or magenta ink compositions of the ink set, a naphthalene-based aromatic compound having a carboxyl group at the second position.

The inventors discovered that an ink set with particularly preferable ozone fastness can be obtained when the ink set includes, for a cyan ink composition and/or a magenta ink composition, two types of ink compositions of different color densities (hereinafter, the magenta and cyan ink compositions of high color densities are called a "dark magenta ink composition" and a "dark cyan ink composition" respectively, and the magenta and cyan ink compositions of low color densities are called a "light magenta ink composition" and a "light magenta ink composition" respectively) and the dyes having the aforementioned relevant specific structures are used as colorants in the light magenta ink composition and/or the light cyan ink composition.

The inventors discovered that when a specific surfactant and/or a penetrating agent were added to the ink compositions constituting the present ink set, a recorded matter with excellent image quality can be obtained.

The inventors also discovered that the present ink set is preferably used in inkjet recording methods.

The present invention has been completed based on these findings.

The ink set according to Embodiment 1 of the present invention comprises a yellow ink composition, a magenta ink composition, and a cyan ink composition. The cyan ink composition of the present invention contains, as a colorant, at least one substance selected from the group consisting of the dyes expressed by formula (1) and the magenta ink composition contains, as a colorant, at least one compound selected from the group consisting of the dyes expressed by formula (2).

The ink set according to Embodiment 2 of the present invention is an ink set including, as the cyan ink composition of Embodiment 1, at least two types of cyan ink compositions of different color densities, that is, at least a dark cyan ink composition and a light cyan ink composition, and at least one of the cyan ink compositions contains at least one of the dyes expressed by formula (1). It is preferable that the light cyan ink composition in particular contain, as a colorant, at least one of the dyes expressed by formula (1). It is also preferable that, in order to prevent the occurrence of bronzing, these cyan ink compositions contain at least one substance selected from the group consisting of naphthalene-based aromatic compounds having a carboxyl group at the second position and salts thereof.

The ink set according to Embodiment 3 of the present invention is an ink set including, as the magenta ink composition of Embodiment 1 or 2, at least two types of magenta ink compositions of different color densities, that is, a dark magenta ink composition and a light magenta ink composition, and at least one of the magenta ink compositions contains at least one of the dyes expressed by formula (2). It is preferable that the light magenta ink composition in particular contain, as a colorant, at least one of the dyes expressed by formula (2). It is also preferable that, in order to enhance the moisture fastness of images, these magenta ink compositions contain at least one substance selected from the group consisting of naphthalene-based aromatic compounds having a carboxyl group at the second position and salts thereof.

In the ink sets according to the above respective embodiments, at least one substance selected from the group consisting of the dyes expressed by formula (5) and formula (6) is used as a colorant in the yellow ink composition. It is further preferable that these compounds and C.I Direct Yellow 58 be used together so that there will be no significant difference in, and a balance can be kept between, the ozone fastness of the yellow ink composition and the ozone fastness of the other ink compositions.

The ink set according to Embodiment 4 of the present invention is the ink set of Embodiment 1, 2, or 3 wherein a black ink composition is further included. The black dye used in the black ink composition is preferably one selected from the group consisting of the dyes expressed by formula (7).

Each of the ink sets of the present invention is used in recording methods using ink compositions, for example, the inkjet recording method, recording methods using writing tools such as pens, and other various printing methods. It is especially preferable that the ink sets of the present invention are used in the inkjet recording method.

Explanations will now be given to the respective ink compositions included in the ink sets of the present invention. First, colorants contained in the respective ink compositions are explained hereinafter on a color-to-color basis. According to the present invention, the ozone fastness of the entire ink set can be enhanced by using, as colorants in the ink compositions of the respective colors, dyes having specific chemical structures.

Here, the colorant used in the cyan ink composition, a constituent of the ink set of the present invention, is explained. In the present invention, the cyan-based dye used as a colorant in the cyan ink composition is a compound selected from the group consisting of phthalocyanine compounds expressed by formula (1) below.

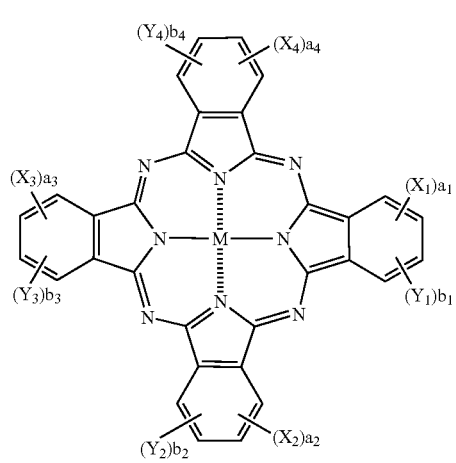

(1)

In formula (1), each of $X_1$, $X_2$, $X_3$ and $X_4$ independently represents —SO—Z or —SO$_2$—Z. Here, each Z independently represents a substituted or non-substituted alkyl group, a substituted or non-substituted cycloalkyl group, a substituted or non-substituted alkenyl group, a substituted or non-substituted aralkyl group, a substituted or non-substituted aryl group, or a substituted or non-substituted heterocyclic group.

Each of $Y_1$, $Y_2$, $Y_3$ and $Y_4$ independently represents a hydrogen atom, a halogen atom, an alkyl group, a cycloalkyl group, an alkenyl group, an aralkyl group, an aryl group, a heterocyclic group, a cyano group, a hydroxy group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamide group, a carbamoyl group, a alkoxycarbonyl group, a heterocyclic oxy group, an azo group, an acyloxy group, a carbomoyloxy group, a silyloxy group, an aryloxycarbonyl group, an aryloxycarbonylamino group, an imide group, a heterocyclic thio group, a phosphoryl group, an acyl group, or an ionic hydrophilic group. Each group may further have a substituent.

$a_1$ to $a_4$ and $b_1$ to $b_4$ represent the number of substituents of $X_1$ to $X_4$ and $Y_1$ to $Y_4$ respectively. Each of $a_1$ to $a_4$ independently represents an integer from 0 to 4 but all of them cannot be 0 at the same time. Each of $b_1$ to $b_4$ also independently represents an integer from 0 to 4.

M represents a hydrogen atom, a metal atom or oxide thereof, a hydroxide, or a halide.

However, at least one of $X_1$, $X_2$, $X_3$, $X_4$, $Y_1$, $Y_2$, $Y_3$, and $Y_4$ is an ionic hydrophilic group or a group having an ionic hydrophilic group as a substituent.

According to the present invention, in formula (1), each of $a_1$, $a_2$, $a_3$, and $a_4$ is 0 or 1 and two or more of them are 1. Each of $b_1$, $b_2$, $b_3$, and $b_4$ is an integer that results in a sum of 4 when added to $a_1$, $a_2$, $a_3$, and $a_4$ respectively.

As described above, in formula (1), each of $X_1$, $X_2$, $X_3$, and $X_4$ independently represents —SO—Z or —SO$_2$—Z, and each Z may further have a substituent. Examples of the substituent that Z can have include a halogen atom (such as a chlorine atom or a bromine atom); a $C_{1-12}$ straight-chain or branched-chain alkyl group, a $C_{7-18}$ aralkyl group, a $C_{2-12}$ alkenyl group, a $C_{2-12}$ straight-chain or branched-chain alkynyl group, a $C_{3-12}$ cycloalkyl group that may have a side chain, or a $C_{3-12}$ cycloalkenyl group that may have a side chain (examples of these groups include methyl, ethyl, propyl, isopropyl, t-butyl, 2-methanesulfonylethyl, 3-phenoxypropyl, torifulorometyl, and cyclopentyl); an aryl group (such as phenyl, 4-t-butylphenyl, or 2,4-di-t-amylphenyl); a heterocyclic group (such as imidazolyl, pyrazolyl, triazolyl, 2-furyl, 2-thienyl, 2-pyrimidinyl, or 2-benzothiazolyl); an alkyloxy group (such as methoxy, ethoxy, 2-methoxyethoxy, or 2-methanesulfonylethoxy); an aryloxy group (such as phenoxy, 2-methylhenoxy, 4-t-butylphenoxy, 3-nitrophenoxy, 3-t-butyloxycarbamoylphenoxy, or 3-methoxycarbamoyl); an acylamino group (such as acetoamido, benzamido, or 4-(3-t-butyl-4-hydroxyphenoxy)butanamido); an alkylamino group (such as methylamino, butylamino, diethylamino, or methylbutylamino); an aniline group (such as phenylamino or 2-chloroanilino); a ureido group (such as phenylureido, methylureido, orand N,N-dibutylureido); a sulfamoylamino group (such as N,N-dipropylsulfamoylamino); an alkylthio group (such as methylthio, octylthio, or 2-phenoxyethylthio); an arylthio group (such as phenylthio, 2-butoxy-5-t-octylphenylthio, or 2-carboxyphenylthio); an alkyloxycarbonylamino group (such as methoxycarbonylamino); a sulfonamide group (such as methanesulfonamido, benzensulfonamido, p-toluenesulfonamido, or octadecane); a carbamoyl group (such as N-ethylcarbamoyl or N,N-dibutylcarbamoyl); a sulfamoyl group (such as N-ethylsulfamoyl, N,N-dipropylsulfamoyl, or N,N-diethylsulfamoyl); a sulfonyl group (such as methanesulfonyl, octanesulfonyl, benzenesulfonyl, or toluenesulfonyl); an alkyloxycarbonyl group (such as methoxycarbonyl or butyloxycarbonyl); a heterocyclic oxy group (such as 1-phenyltetrazol-5-oxy or 2-tetrahydropyranyloxy); an azo group (such as phenylazo, 4-methoxyphenylazo, 4-pivaloylaminophenylazo, or 2-hydroxy-4-propanoylphenylazo); an acyloxy group (such as acetoxy); a carbamoyloxy group (such as N-methylcarbamoyloxy or N-phenylcarbamoyloxy); a silyloxy group (such as trimethylsilyloxy or dibutylmethylsilyloxy); an aryloxycarbonylamino group (such as phenoxycarbonylamino); an imide group (such as N-succinimide or N-phthalimide), a heterocyclic thio group (such as 2-benzothiazolylthio, 2,4-di-phenoxy-1,3,5-triazol-6-thio, or 2-pyridylthio); a sulfinyl group (such as 3-phenoxypropylsulfinyl); a phosphonyl group (such as phenoxyphosphonyl, octyloxyphosphonyl or phenylphosphonyl); an aryloxycarbonyl group (such as phenoxycarbonyl); an acyl group (such as acethyl, 3-phenylpropanoyl, or benzoyl); an ionic hydrophilic group (such as a carboxyl group, a sulfo group, or a quaternary ammonium group); a cyano group: a hydroxyl group; a nitro group; and an amino group.

Moreover, examples of the ionic hydrophilic group in formula (1) include a sulfo group, a carboxyl group, and a quaternary ammonium group, and the like. Among them, the carboxyl group and the sulfo group are preferable but the sulfo group is particularly preferable. The carboxyl group and the sulfo group may be in the state of salts. Specific examples of the counterions forming the salts include alkali metal ions (for example, sodium, potassium, and lithium ions) and organic cations (for example, a tetramethylguanidium ion).

Of the compounds expressed by formula (1), a preferable compound is a compound in which M is a copper atom, $X_1$ to $X_4$ represent —$SO_2Z$, and Z represents $R^5$ ($R^5$ represents —$(CH_2)_3SO_3M^2$ and here $M^2$ represents an alkali metal atom) and/or $R^6$ ($R^6$ represents —$(CH_2)_3SO_2NHCH_2CH(OH)CH_3$). In a more preferable compound, $M^2$ is Li. A particularly preferable compound expressed by formula (1) is a mixture of tetrasulfonic acid, trisulfonic acid, and disulfonic acid in which $R^5/R^6$ (molar ratio)=3/1. The tetrasulfonic acid, trisulfonic acid, and disulfonic acid correspond respectively to the case in which $a_1$ to $a_4$ are all 1, the case in which three of them are 1 and the residue is 0, and the case in which two of them are 1 and the residue are 0.

A synthetic method for the compounds expressed by formula (1) is shown below.

In the above reaction formula, the phthalocyanine compound expressed by general formula II is one of the compounds expressed by formula (1) and can be used in the present invention. The phthalocyanine compound expressed by general formula II can be synthesized by causing a reaction between a metal derivative expressed by M—(Y)d and a phthalonitrile compound expressed by general formula III above and/or a diiminoisoindoline derivative. In general formula II, formula III, and formula IV, Z and $Z_1$ to $Z_4$ represent what Z in formula (1) does and M represents what in formula (1) does. Here, Y represents a monovalent or divalent ligand of a halogen atom, acetate anion, acetylacetonate, and oxygen, and d is an integer 1 to 4. Examples of a metal derivative expressed by M—(Y)d include halides, carboxylic acid derivatives, sulfates, nitrates, carbonyl compounds, oxides and other such complexes of Al, Si, Ti, V, Mn, Fe, Co, Ni, Cu, Zn, Ge, Ru, Rh, Pd, In, Sn, Pt, and Pb. Specific examples of the metal derivative include cuprous chloride, cuprous bromide, cuprous iodide, nickel chloride, nickel bromide, nickel acetate, cobalt chloride, cobalt bromide, cobalt acetate, iron chloride, zinc chloride, zinc bromide, zinc iodide, zinc acetate, vanadium chloride, vanadium oxytrichloride, palladium chloride, palladium acetate, aluminium chloride, manganese chloride, manganese acetate, manganese acetylacetone, lead chloride, lead acetate, indium chloride, titanium chloride, tin chloride and the like.

A compound obtained as above and expressed by general formula II is usually a mixture of the compounds expressed by general formulas (a)-1 to (a)-4 below, the compounds being the configurational isomers of ($SO_2$—$Z_1$), ($SO_2$—$Z_2$), ($SO_2$—$Z_3$), and ($SO_2$—$Z_4$) (these groups also correspond to $R_1$, $R_2$, $R_3$, and $R_4$ in formula (1)) in general formula II.

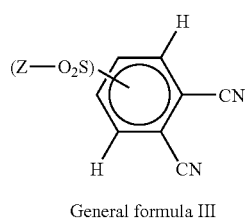

General formula III

&/or

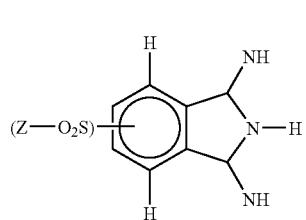

General formula IV

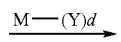

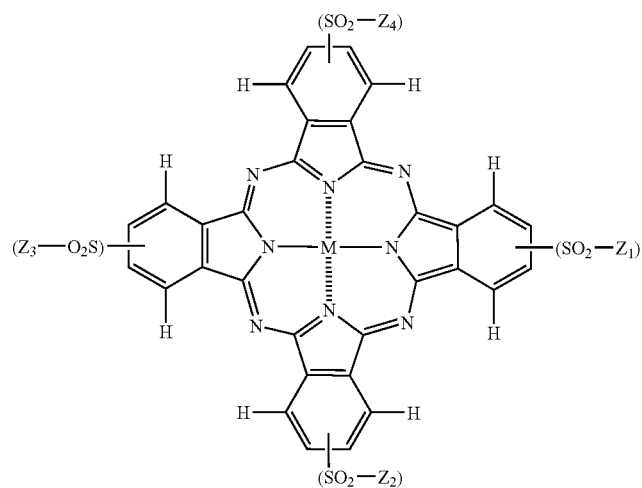

General formula II

General formula (a)-1

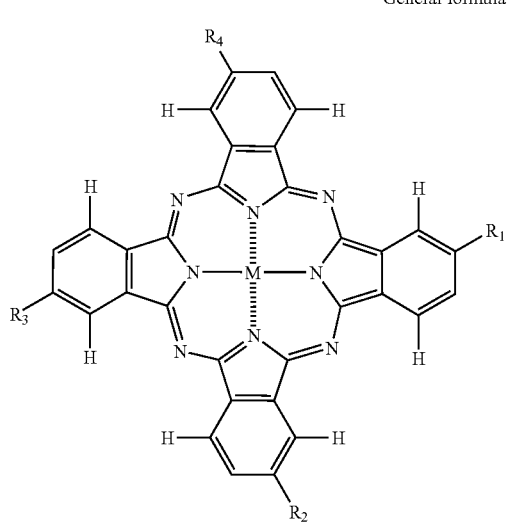

General formula (a)-2

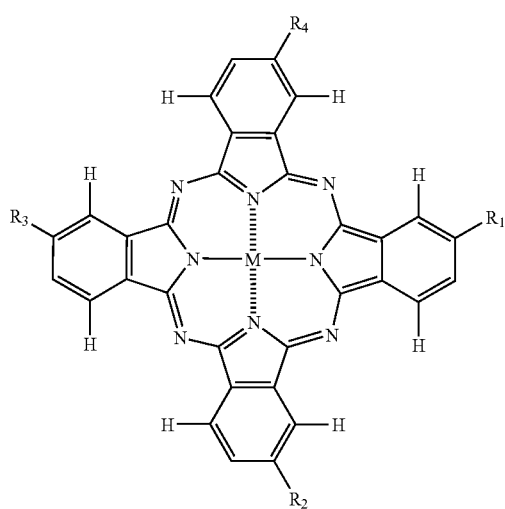

General formula (a)-3

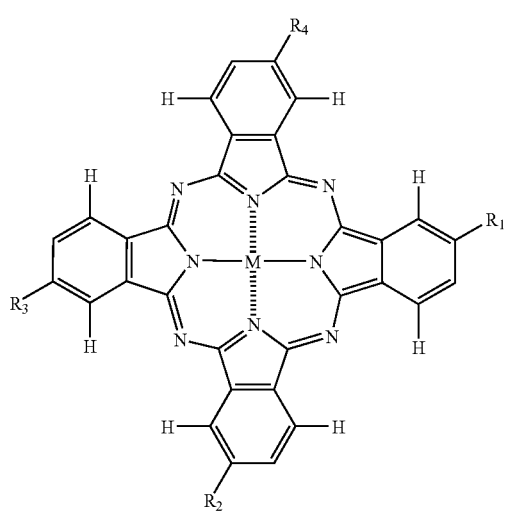

-continued

General formula (a)-4

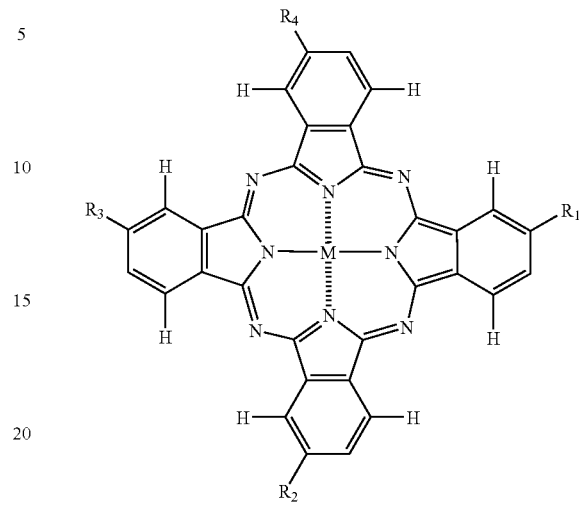

In the present invention, the content of the cyan-based dyes contained in the cyan ink composition is determined based on the types of $X_1$ to $X_4$ and $Y_1$ to $Y_4$ in formula (1) and the type of solvent component used for manufacturing the ink composition. In the present invention, the total amount of the cyan-based dyes expressed by formula (1) (the dyes of formula (1)) is preferably 1 to 10 wt %, more preferably 2 to 6 wt % of the entire cyan ink composition. Within that range, when the total amount of the dyes of formula (1) in the cyan ink composition is 1 wt % or more, an ink with good coloring properties can be obtained on a recorded medium and the necessary image density can be ensured. When the total amount of the dyes of formula (1) in the cyan ink composition is 10 wt % or more, good discharge ability of the cyan ink composition can be obtained and clogging of the inkjet nozzle can be prevented when employing the inkjet recording method.

The present ink set may include, as the cyan ink composition, a high color density cyan ink composition (dark cyan ink composition) and a low color density cyan ink composition (light cyan ink composition). In this case, preferably at least one of these cyan ink compositions (more preferably the light cyan ink composition) contains, as a colorant, at least one substance selected from the dyes of formula (1). It is most preferable that both the dark cyan ink composition and the light cyan ink composition contain, as colorants, at least one substance selected from the dyes of formula (1).

As described above, when the ink set includes the dark and light cyan ink compositions, the density of the colorant in the light cyan ink composition can be appropriately determined according to the type of dyes used as the colorant, so that a favorable color balance can be obtained when the light cyan ink composition is combined with the dark cyan ink composition. In general, the total amount of the dyes of formula (1) in the light cyan ink composition is preferably 0.4 to 3.0 wt % of the entire light cyan ink composition. Within that range, when a light cyan ink composition has a colorant density of 0.4 wt % or more, it exhibits excellent coloring properties, while when a light cyan ink composition has a colorant density of 3.0 wt % or less, granularity in a recorded image can be reduced. On the other hand, in the dark cyan ink composition, the total amount of the dyes of formula (1) is preferably 2.0 to 10.0 wt % of the entire dark cyan ink composition. Moreover, the ratio of the density (wt %) of the colorant in the light cyan ink composition to the density (wt %) of the colorant in the dark cyan ink composition is preferably 1:2 to 1:8. When these requirements are satisfied, a good color balance can be achieved between the light and the dark cyan ink compositions and clogging of the inkjet nozzle can be prevented.

Together with the above cyan-based dyes, it is possible to use, in the cyan ink composition or the dark and light cyan ink compositions of the present ink set, other cyan-based dyes to the extent the ozone fastness would not be remarkably impaired so that the color tone of the inks can be adjusted. Examples of other cyan-based dyes that can be used in the present invention include but are not limited to C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 291; C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, 326; C.I. Reactive Blue 2, 3, 5, 8, 10, 13, 14, 15, 17, 18, 19, 21, 25, 26, 27, 28, 29, 38; and C.I. Basic Blue 1, 3, 5, 7, 9, 22, 26, 41, 45, 46, 47, 54, 57, 60, 62, 65, 66, 69, and 71.

Next, the colorant used in the magenta ink composition of the present ink set is explained. The magenta ink composition of the present invention contains as a colorant at least one of the dyes of formula (2). The compounds expressed by formula (2) and the salts thereof may be manufactured in any method, but as one example, they can be manufactured as follows:

(1) 1-methylamino-4-bromoanthraquinone is reacted with ethyl benzoylacetate in a solvent to obtain 1-benzoyl-6-bromo-2,7-dihydro-3-methyl-2,7-dioxo-3H-dibenzo[f,ij] isoquinoline.

(2) Next, the compound obtained in (1) and metaminoacetanilide are reacted in a solvent to obtain 3'-[1-benzoyl-2,7-dihydro-3-methyl-2,7-dioxo-3H-dibenzo[f,ij]isoquinoline-6-ylamino]-acetanilide.

(3) Then, the compound obtained in (2) is reacted in fuming sulfuric acid to obtain trisodium-6-amino-4-[2,7-dihydro-3-methyl-1-(3-sulfonatobenzoyl)-2,7-dioxo-3H-dibenzo [f,ij]isoquinoline-6-ylamino]-benzene-1,3-disulfonate.

(4) Subsequently, the compound obtained in (3) and cyanuric chloride are reacted in water to obtain a primary condensate, which is in turn reacted with diamine having the coupling group A indicated in formula (2) to obtain a secondary condensate.

(5) The compound obtained in (4) is directly hydrolyzed or reacted with ammonia into a tertiary condensate to obtain a target compound expressed by formula (2).

The magenta ink composition of the present invention contains as a colorant at least one of the compounds expressed by formula (2) and salts thereof (the dyes of formula (2)).

The present ink set may include as the magenta ink composition a dark magenta ink composition and a light magenta ink composition. In this case, preferably at least one of the magenta ink compositions—more preferably the light magenta ink composition—contains, as a colorant, one of the dyes of formula (2). When the ozone fastness of the light magenta ink composition is enhanced, the ozone fastness of the entire image of the recorded matter is enhanced. Most preferably, both the dark and light magenta ink compositions contain, as colorants, the dyes of formula (2).

In the present ink set, the density of the dyes in the magenta ink composition can be appropriately determined based on the color value of the dyes of formula (2) used therein. In the case where the ink set includes solely the magenta ink composition, the total amount of the dyes of formula (2) in the magenta ink composition is preferably 2.0 to 10 wt % in general. Within that range, when the density of the dyes is 2.0 wt % or more, an ink with adequate coloring properties can be obtained, and when the density of the dyes is 10 wt % or less, good discharge ability from the nozzle can be ensured and nozzle clogging can be prevented with an ink composition used in the inkjet recording method.

In the case where the ink set includes the dark magenta ink composition and the light magenta ink composition, the density of the dyes in the light magenta ink composition can be appropriately determined according to the color value of the dyes of formula (2) used as the colorants therein. In general, the total amount of the dyes of formula (2) contained in the light magenta ink composition is preferably 0.5 to 3.5 wt %, more preferably 1.0 to 3.0 wt %. Within that range, when the density of the dyes is 0.5 wt % or more, the necessary coloring properties can be obtained for the light magenta ink composition, while when the density of the dyes is 3.5 wt % or less, granularity can be reduced or prevented in an image recorded with the light magenta ink composition on a recorded matter.

In the case where the ink set includes both the dark and light magenta ink compositions, the ratio of the content (wt %) of the colorant in the light magenta ink composition to the content (wt %) of the colorant in the dark magenta ink composition is preferably 1:2 to 1:8. With this ratio of the colorant content, granularity can be reduced in an image recorded with the ink compositions. Moreover, when the ink compositions have the above colorant ratio and the densities of the colorants are in the described range, a good color balance can be achieved between the dark and the light magenta ink compositions and clogging of the inkjet nozzle can be prevented.

In the magenta ink composition of the present ink set, it is particularly preferable that at least one of the dyes of formula (2) is used as a colorant due to their excellent ozone fastness. Together with the dye of formula (2), at least one substance selected from the groups consisting of the compounds expressed by formula (4) below:

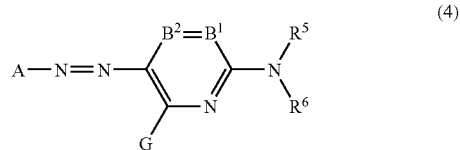

and salts thereof can be used as desired.

In formula (4), A represents a residue of a five-member heterocyclic diazo component A—$NH_2$. Each of $B^1$ and $B^2$ represents —$CR^1$= or —$CR^2$=, or one of them represents a nitrogen atom and the other represents —$CR^1$= or —$CR^2$=. Each of $R^5$ and $R^6$ independently represents a hydrogen atom, an alkyl group, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, an arylsulfonyl group, or a sulfamoyl group. Each group may further have a substituent. Each of G, $R^1$, and $R^2$ independently represents a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted by an alkyl group or an aryl group or a heterocyclic group, an acylamino group, a ureido group, a sulfamoylamino group, an alkoxycarbonylamino group, an aryloxycarbonylamino group, an alkyl and arylsulfonylamino group, a nitro group, an alkyl and arylthio group, an alkyl and arylsulfonyl group, an alkyl and arylsulfinyl group, a sulfamoyl group, a sulfo group, or a heterocyclicthio group. Each group may further be substituted. $R^1$ and $R^5$, or $R^5$ and $R^6$ may be bonded to form a five or six-member ring.

The compounds expressed by the formula (4) are preferably the compounds expressed by formula (4a) below:

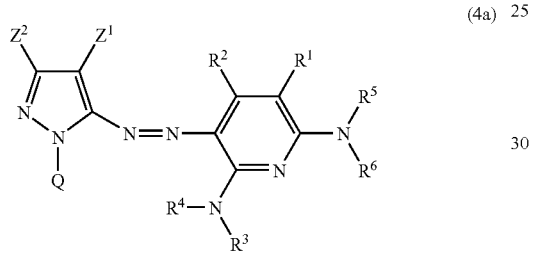

(4a)

In formula (4a), $Z^1$ represents an electron attractive group having a Hammett substituent constant σp value 0.20 or more; $Z^2$ represents a hydrogen atom, an alkyl group, an alkenyl group, an alkynyl group, an aralkyl group, an aryl group, or a heterocyclic group; each of $R^1$, $R^2$, $R^5$ and $R^6$ represents the same as in formula (4). $R^3$ and $R^4$ independently represent a hydrogen atom, an alkyl group, alkenyl group, an alkynyl group, an aralkyl group, an aryl group, a heterocyclic group, an acyl group, an alkoxycarbonyl group, an aryloxycarbonyl group, a carbamoyl group, a sulfonyl group, or a sulfamoyl group. Q represents a hydrogen atom, an alkyl group, an alkenyl group, an alkynyl group, an aralkyl group, an aryl group, or a heterocyclic group. Each of $Z^1$, $Z^2$, $R^1$ to $R^6$, and Q may further have a substituent.

Further explanations are given for the compounds expressed by formula (4). In the formula, A represents a residue of a five-member heterocyclic diazo component A—$NH_2$. Examples of five-member heterocyclic hetero atoms include N, O and S. The five-member heterocyclic hetero atom is preferably a nitrogeneous five-member heterocyclic ring and it is preferable that an aliphatic ring, an aromatic ring, or other heterocyclic ring may be fused in the heterocyclic ring. Preferable examples of the heterocyclic ring of A include a pyrazole ring, an imidazole ring, a thiazole ring, an isothiazole ring, a thiadiazole ring, a benzothiazole ring, a benzoxazole ring, and a benzisothiazole ring. Each heterocyclic group may further have a substituent. Among these, the pyrazole ring, the imidazole ring, the isothiazole ring, the thiadiazole ring and the benzothiazole ring that are expressed by formula (a) to formula (f) below are preferable.

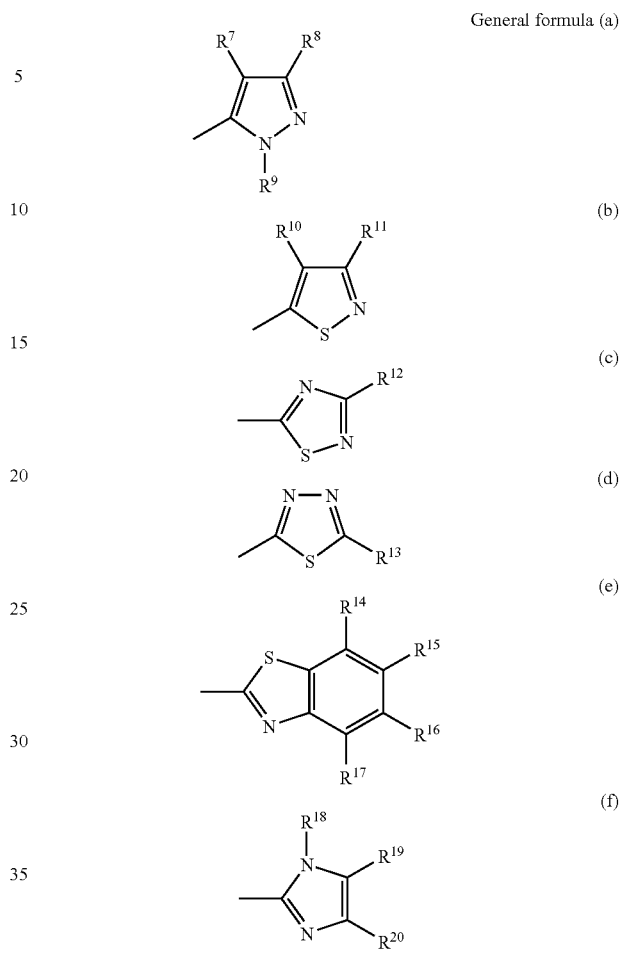

$R^7$ to $R^{20}$ in formula (a) to formula (f) represent the same substituents as the substituents G, $R^1$, and $R^2$ that are explained later. Among the formula (a) to formula (f), the pyrazole ring and the isothiazole ring expressed by formula (a) and formula (b) are preferable, and the pyrazole ring expressed by formula (a) is most preferable.

$B^1$ and $B^2$ independently represent —$CR^1$= or —$CR^2$=, or one of them may represent a nitrogen atom while the other may represent —$CR^1$= or —$CR^2$=. It is preferable that they independently represent —$CR^1$= or —$CR^2$=.

$R^5$ and $R^6$ independently represent a hydrogen atom, an alkyl group, an alkenyl group, an alkynyl group, an aralkyl group, an aryl group, a heterocyclic group, an acyl group, an alkoxycarbonyl group, an aryloxycarbonyl group, a carbamoyl group, an alkyl and arylsulfonyl group, or a sulfamyl group. Each group may further have a substituent. Preferable examples of the substituents expressed by $R^5$ and $R^6$ include a hydrogen atom, an alkyl group, an alkenyl group, an alkynyl group, an aralkyl group, an aryl group, a heterocyclic group, an acyl group, and an alkyl and arylsulfonyl group. Among these, preferable are the hydrogen atom, the aryl group, the heterocyclic group, the acyl group, and the alkyl and arylsulfonyl group, and the most preferable are the hydrogen atom, the aryl group and the heterocyclic group. Each group may further have a substituent. However, $R^5$ and $R^6$ cannot be hydrogen atoms simultaneously.

Each of G, $R^1$ and $R^2$ represents a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted with an alkyl group or an aryl group or a heterocyclic group, an acylamino group, a ureido group, a sulfamoylamino group, alkoxycarbonylamino group, an aryloxycarbonylamino group, an alkyl and aryl sulfonylamino group, a nitro group, an alkyl and arylthio group, a heterocyclic thio group, an alkyl and arylsulfonyl group, an alkylsulfinyl group, an arylsulfinyl group, a sulfamoyl group, or a sulfo group. Each group may further be substituted.

Preferable examples of G include a hydrogen atom, a halogen atom, an alkyl group, an alkenyl group, an alkynyl group, an aralkyl group, an aryl group, a hydroxyl group, an alkoxy group, an aryloxy group, an acyloxy group, a heterocyclic oxy group, an amino group substituted with an alkyl group or an aryl group or a heterocyclic group, an acylamino group, an ureido group, a sulfamoylamino group, an alkoxycarbonylamino group, an aryloxycarbonylamino group, an alkyl and arylthio group, and a heterocyclic thio group. Among these, preferable are a hydrogen atom, a halogen atom, an alkyl group, a hydroxyl group, an alkoxy group, an aryloxy group, an acyloxy group, an amino group substituted with an alkyl group or an aryl group or a heterocyclic group, or an acylamino group. Most preferable are a hydrogen atom, an arylamino group and an amido group. Each group may further have a substituent.

Preferable substituents expressed by $R^1$ and $R^2$ include a hydrogen atom, an alkyl group, an alkoxycarbonyl group, a carboxyl group, a carbamoyl group and a cyano group. Each group may further have a substituent. $R^1$ and $R^5$ or $R^5$ and $R^6$ may be bonded to form a five to six-member ring. When the respective substituents shown as A, $R^1$, $R^2$, $R^5$, $R^6$ and G have further substituents, examples of such further substituents include those listed in the explanations of G, $R^1$ and $R^2$.

When the azo dye expressed by formula (4) is a soluble dye, it is preferable that an ionic hydrophilic group be further provided as a substituent at any position of A, $R^1$, $R^2$, $R^5$, or G. Examples of the ionic hydrophilic group as a substituent include a sulfo group, a carboxyl group, and a quaternary ammonium group. Preferable as the ionic hydrophilic group are a carboxyl group and a sulfo group, and the sulfo group is particularly preferable. The carboxyl group and the sulfo group may be in the state of salts. Examples of counterions forming the salts include alkali metal ions (for example, sodium, potassium, and lithium ions) ammonium ions and organic cations (for example, tetramethyl ammonium and tetramethylguanidium ions).

In the present invention, of the azo dyes expressed by formula (4), particularly preferable are those expressed by formula (4a). In formula (4a), $Z^1$ represents an electron attractive group having a Hammett substituent constant, a σq value, of 0.20 or more. $Z^1$ is preferably an electron attractive group having a σq value of 0.30 to 1.0. Preferable and specific examples of the substituents may include the electron attractive substituents described later, and among these, a $C_{2-12}$ acyl group, $C_{2-12}$ alkyloxycarbonyl group, a nitro group, a cyano group, a $C_{1-12}$ alkylsulfonyl group, a $C_{6-18}$ arylsulfonyl group, a $C_{1-12}$ carbamoyl group, and a $C_{1-12}$ alkyl halide group are preferable. Particularly preferable are a cyano group, a $C_{1-12}$ alkylsulfonyl group, a $C_{6-18}$ arylsulfonyl group and the most preferable is a cyano group.

$R^1$, $R^2$, $R^5$ and $R^6$ in formula (4a) represent the same as in formula (4). $R^3$ and $R4$ independently represent a hydrogen atom, an alkyl group, an alkenyl group, an alkynyl group, an aralkyl group, an aryl group, a heterocyclic group, an acyl group, an alkoxycarbonyl group, an aryloxycarbonyl group, a carbamoyl group, an alkyl and arylsulfonyl group, or a sulfamoyl group. Among these, the hydrogen atom, the aryl group, the heterocyclic group, the acyl group, the alkyl and arylsulfonyl group are preferable and the most preferable are the hydrogen atom, the aryl group and the heterocyclic group. $Z^2$ represents a hydrogen atom, an alkyl group, an alkenyl group, an alkynyl group, an aralkyl group, an aryl group, or a heterocyclic group.

In formula (4a), Q represents a hydrogen atom, an alkyl group, an alkenyl group, an alkynyl group, an aralkyl group, an aryl group or a heterocyclic group. Q is preferably a group consisting of non-metal groups, which is necessary to form a five to eight-member ring. The five to eight-member ring may be substituted or it may be a saturated ring or have an unsaturated bond. Of the above, the aryl group or the heterocyclic group is preferable as Q. Preferable examples of the non-metal atom include a nitrogen atom, an oxygen atom, a sulfur atom, and a carbon atom. Specific examples of the five to eight-member ring include a benzene ring, a cyclopentane ring, a cyclohexane ring, a cycloheptane ring, a cyclooctane ring, a cyclohexene ring, a pyridine ring, a pyrimidine ring, a pyrazine ring, a pyridazine ring, a triazine ring, an imidazole ring, a benzimidazole ring, an oxazole ring, a benzoxazole ring, a thiazole ring, a benzothiazole ring, an oxane ring, a sulfolane ring, a thian ring, and the like.

Each group explained with regard to formula (4a) may further have a substituent. In that case, examples of the substituents include the substituents explained regarding formula (4), the groups exemplified with G, $R^1$, and $R^2$, and the ionic hydrophilic group.

Examples of the electron attractive group having a Hammett substituent constant σp value of 0.60 or above include a cyano group, a nitro group, an alkylsulfonyl group (for example, a methanesulfonyl group), and an arylsulfonyl group (for example, a benzenesulfonyl group). Examples of the electron attractive group having a Hammet σp value of 0.45 or above include, in addition to the above, an acyl group (for example, an acetyl group), an alkoxycarbonyl group (for example, a dodecyloxycarbonyl group), an aryloxycarbonyl group (for example, m-chlorophenoxycarbonyl), an alkylsulfinyl group (for example, n-propylsulfinyl), an arylsulfinyl group (for example, phenylsulfinyl), a sulfamoyl group (for example, N-ethylsulfamoyl, N,N-dimethylsulfamoyl), and an alkyl halide (for example, trifloro).

Examples of the electron attractive group having a Hammet substituent constant σp value of 0.30 or above include, in addition to the above, an acyloxy group (for example, acetoxy), a carbamoyl group (for example, N-ethylcarbamoyl, N,N-dibutylcarbamoyl), an alkoxy halide (for example, trifloromethyloxy), an aryloxy halide (for example, pentaflorophenyloxy), a sulfonyloxy group (for example, methylsulfonyloxy group), an alkylthio halide (for example difluoromethythio), an aryl group substituted with an electron attractive group having two or more σq values of 0.15 or above (for example, 2,4-dinitrophenyl, pentachlorophenyl), and a heterocyclic ring (for example, 2-benzoxazolyl, 2-benzothiazolyl, and 1-phenyl-2-benzimidazolyl). Specific examples of the electron attractive group having a σp value 0.20 or above include, in addition to the above, a halogen atom.

The followings are the combinations of the substituents that are particularly preferable as the azo dye expressed by formula (4).

(A) Preferably, $R^5$ and $R^6$ are independently a hydrogen atom, an alkyl group, an aryl group, a heterocyclic group, a sulfonyl group, or an acyl group. More preferably, they are independently a hydrogen atom, an aryl group, a heterocyclic group, or a sulfonyl group. Most preferably, they are independently a hydrogen atom, an aryl group, or a heterocyclic group. However, $R^5$ and $R^6$ cannot be hydrogen atoms at the same time.

(B) G is preferably a hydrogen atom, a halogen atom, an alkyl group, a hydroxyl group, an amino group, or an amido group. More preferably, it is a hydrogen atom, a halogen atom, an amino group, or an amido group. Most preferably, it is a hydrogen atom, an amino group or an amido group.

(C) A is preferably a pyrazole ring, an imidazole ring, a isothiazole ring, thiadiazole ring, or a benzothiazole ring. More preferably, it is a pyrazole ring or an isothiazole ring. Most preferably, it is a pyrazole ring.

(D) $B^1$ and $B^2$ are —$CR^1$= or —$CR^2$= independently. Preferably, $R^1$ and $R^2$ are a hydrogen atom, a halogen atom, a cyano group, a carbamoyl group, a carboxyl group, an alkyl group, a hydroxyl group, or an alkoxy group independently. More preferably, they are a hydrogen atom, a cyano group, a carbamoyl group, or an alkyl group independently.

Of the combinations of substituents of compounds expressed by formula (4), a compound where at least one of various substituents therein is one in the above-listed preferable groups is preferable. A compound where more than one of the substituents therein are ones in the above-listed groups is more preferable. The most preferable compound is a compound where all of the substituents therein are the ones in the above-listed groups.

The compounds expressed by formula (4) may be manufactured in any method, an example of which is as follows:

(a) The compound expressed by general formula (4b) below and a diazo agent are reacted to form diazonium salt.
(b) The diazonium salt formed in step (a) is reacted with a coupling agent expressed by formula (4c) below to form a compound expressed by formula (4).
(c) In the presence of a base, the compound formed in step (b) is reacted with an alkylating agent, an aryl agent, or a heteryl agent to form a compound expressed by formula (4) in which a substituent such as an alkyl group is introduced.

General Formula (4b)

A—$NH_2$      General formula (4b)

General formula (4c)

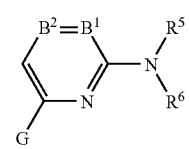

(In formula (4b) and formula (4c), A, G, $B^1$, $B^2$, $R^5$, and $R^6$ represent the same thing as they do in formula (4).)

When a soluble group is introduced into the compound of formula (4), an electrophillic reaction is employed. Examples of the electrophillic reaction include sulfonation, the Mannich reaction, and the Friedel-Crafts reaction, among which sulfonation is particularly preferable.

The following are specific examples of the compounds expressed by formula (4) that can be preferably used in the present invention.

-continued

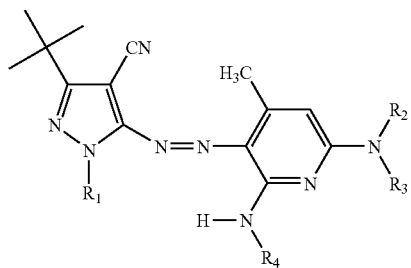

| Dye | R₁ | R₂ | R₃ | R₄ |
|---|---|---|---|---|
| 3 | 2-methylbenzothiazol-6-yl-SO₃Li | 2-methylbenzothiazol-6-yl-SO₃Li | 3,4,5-trimethylphenyl-SO₃Li | 3,4,5-trimethylphenyl-SO₃Li |
| 4 | 2-methylbenzothiazol-6-yl-SO₃Na | 2-methylbenzothiazol-6-yl-SO₃Na | 3,5-dimethyl-4-[CH₂N(CH₂COOH)₂]phenyl | 3,5-dimethyl-4-[CH₂N(CH₂COOH)₂]phenyl |
| 5 | 2-methylbenzothiazol-6-yl | 2-methylbenzothiazol-6-yl | 2,3,5,6-tetramethylphenyl-SO₃K | 2,3,5,6-tetramethylphenyl-SO₃K |
| 6 | 2-methylbenzothiazol-6-yl-SO₃K | 2-methylbenzothiazol-6-yl | 2,3,5,6-tetramethylphenyl-SO₃K | 2,3,5,6-tetramethylphenyl-SO₃K |
| 7 | 2,6-dimethylbenzothiazol-? | 2-methylbenzothiazol-6-yl-SO₃K | 2,3,5,6-tetramethylphenyl-SO₃K | 2,3,5,6-tetramethylphenyl-SO₃K |
| 8 | 2-methylbenzothiazol-6-yl-SO₃K | 2,3,5,6-tetramethylphenyl-SO₃K | 2-methylbenzothiazol-6-yl-SO₃K | 2,3,5,6-tetramethylphenyl-SO₃K |
| 9 | 2-methylbenzothiazol-6-yl-SO₃Na | 2,4-dimethylphenyl-SO₃Na | 2-methylbenzothiazol-6-yl-SO₃Na | 2,4-dimethylphenyl-SO₃Na |

-continued

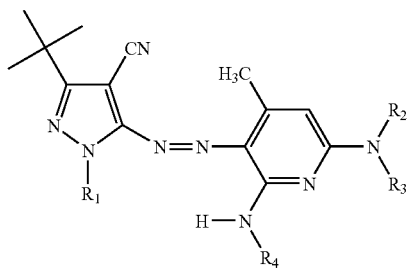

| Dye | R₁ | R₂ | R₃ | R₄ |
|-----|----|----|----|----|
| 10 | 2-benzothiazolyl | 3,4,5-trimethylphenyl-SO₃K | 2-benzothiazolyl | 3,4,5-trimethylphenyl-SO₃K |
| 11 | 2-benzothiazolyl | trimethyl-bis(SO₃K)-phenyl | 2-benzothiazolyl | trimethyl-bis(SO₃K)-phenyl |
| 12 | 5-nitro-2-benzothiazolyl | 3,4-dimethylphenyl-SO₃K | 6-sulfo(K)-2-benzothiazolyl | 2-methoxy-4-methyl-phenyl-SO₃K |
| 13 | 6-[(3,5-dicarboxyphenyl)sulfamoyl]-2-benzothiazolyl | 2,4,5-trimethyl-3-SO₃K-phenyl | 2-benzothiazolyl | 2,4,6-trimethyl-3-SO₃K-phenyl |
| 14 | 6-sulfo(K)-2-benzothiazolyl | 2-methyl-benzoic acid | 6-sulfo(K)-2-benzothiazolyl | 2-methyl-benzoic acid |
| 15 | 5-sulfo(Na)-2-benzothiazolyl | trimethyl-bis(SO₃Na)-phenyl | 5-sulfo(Na)-2-benzothiazolyl | 2,4,6-trimethyl-3-SO₃Na-phenyl |

-continued

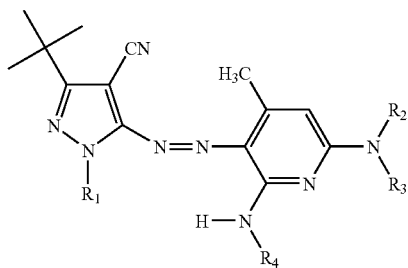

| Dye | R₁ | R₂ | R₃ | R₄ |
|---|---|---|---|---|
| 16 | 2-methylbenzothiazole-6-SO₃Li | 2,4,5-trimethylphenyl-6-SO₃Li | 2-methylbenzothiazole-6-SO₃Li | 2,4,5-trimethylphenyl-6-SO₃Li |
| 17 | 2-methylbenzothiazole-6-SO₃H·NH₃ | 2,4,5-trimethylphenyl-6-SO₃H·NH₃ | 2-methylbenzothiazole-6-SO₃H·NH₃ | 2,4,5-trimethylphenyl-6-SO₃H·NH₃ |

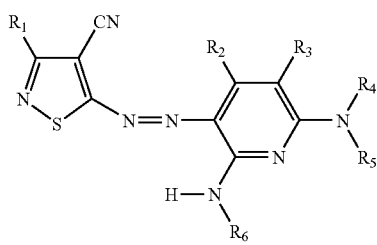

| Dye | R₁ | R₂ | R₃ | R₄ | R₅ | R₆ |
|---|---|---|---|---|---|---|
| b-1 | $CH_3$ | H | CN | H | | 4-(4-sulfonatophenyl)phenyl chain with two SO₃Na |
| b-2 | $CH_3$ | H | H | $SO_2CH_3$ | | bis(methylphenyl) chain with two SO₃Na |

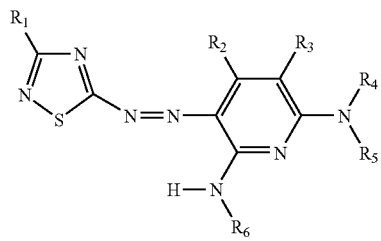

| Dye | $R_1$ | $R_2$ | $R_3$ | $R_4$ | $R_5$ | $R_6$ |
|---|---|---|---|---|---|---|
| c-1 | ⌬—(phenyl) | H | $CONH_2$ | H | ⌬—$SO_3K$ | ⌬—$SO_3K$ |
| c-2 | —S—CH₂CH₂—$SO_3K$ | $CH_3$ | H | 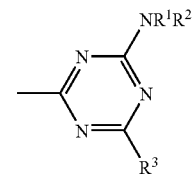 (2-methyl-benzothiazole-6-$SO_3K$) | ⌬—$SO_3K$ | ⌬—$SO_3K$ |

For the magenta, dark magenta, or light magenta ink compositions, the content of a colorant selected from the group consisting of the compounds expressed by formula (4) and salts thereof, is determined according to the types of the respective substituents and the types of solvent components in formula (4). Including at least one dye contained in the ink composition and selected from the group consisting of the compounds expressed by formula (2) and salts thereof, the total amount of the colorant contained in the ink composition is preferably in the range of 0.1 to 10 wt %, more preferably 0.5 to 5 wt % of the entire ink composition. When the amount of the colorant in the ink composition is 0.1 wt % or more, appropriate coloring properties and image density can be obtained on a recording medium. When the amount is 10 wt % or less, adjustment of the viscosity of the ink composition becomes easy and properties such as discharge reliability and clogging resistance can be easily ensured.

Examples of a magenta-based dye which is used with the dye selected from the group consisting of the dyes of formula (2) and formula (4) include: C.I Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243, 247; C.I Direct Violet 7, 9, 47, 48, 51, 66, 90, 93, 94, 95, 98, 100, 101; C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, 397; C.I. Acid Violet 5, 34, 43, 47, 48, 90, 103, 126; C.I. Reactive Red 3, 13, 17, 19, 21, 22, 23, 24, 29, 35, 37, 40, 41, 43, 45, 49, 55; C.I. Reactive Violet 1, 3, 4, 5, 6, 7, 8, 9, 16, 17, 22, 23, 24, 26, 27, 33, 34; C.I. Basic Red 12, 13, 14, 15, 18, 22, 23, 24, 25, 27, 29, 35, 36, 38, 39, 45, 46; and C.I. Basic Violet 1, 2, 3, 7, 10, 15, 16, 20, 21, 25, 27, 28, 35, 37, 39, 40, 48. The compounds expressed by formula (9) below are also examples of such magenta-based dye.

The compounds expressed by formula (9) are as follows.

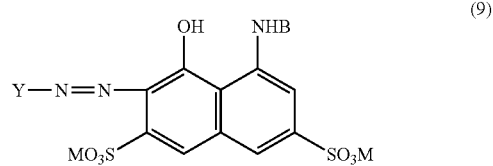

(9)

[In formula (9), Y represents a $C_{1-4}$alkyl group; an alkoxy group; a phenyl group substituted with OH, $SO_3H$, or COOM; or a naphtyl group. B represents H or the following formula.

(triazine structure with $NR^1R^2$ and $R^3$ substituents)

(In this formula, $R^1$ represents a $C_{1-4}$ alkyl group substituted with H, OH, or COOH, $R^2$ represents a $C_{1-4}$alkyl group substituted with OH, $OCH_3$, $OC_2H_5$, $SO_3M$, or COOM, and M represents H, Li, Na, K, ammonium, or an organic amines.)

Next, the colorant used in the yellow ink composition, a constituent of the ink set of the present invention is explained. In the present ink set, a colorant for the yellow ink composition is not limited to a colorant having a specific structure, however, it is preferably one that makes little difference in ozone fastness between the yellow ink composition and the other color ink compositions. The colorant used in the yellow ink composition of the present ink set preferably contains at least one substance selected from the group consisting of the compounds expressed by formula (5) (the dyes of formula (5)) and the compounds expressed by formula (6) (the dyes of formula (6)). When at least one substance selected from the group consisting of the dyes expressed by formula (5) and formula (6) is used as the colorant for the yellow ink composition, it is possible to obtain a yellow ink composition whose ozone fastness is better than that of other color ink compositions. Moreover, when at least one substance selected from the group consisting of the dyes of formula (5) and formula (6) is combined with C.I. Direct Yellow 58, a good balance can be kept between the ozone fastness of the yellow ink composition and that of the other color ink compositions, thereby resulting in better ozone fastness for the entire ink set. Furthermore, in the present invention, another yellow-based dye may be used with at least one dye selected from the group consisting of the dyes of formula (5) and formula (6), or with the combination of one dye from that group and C.I. Direct Yellow 58, to the extent that the ozone fastness is not considerably compromised.

Examples of the yellow-based dye used together with the above include but are not limited to: C.I. Direct Yellow 8, 9, 11, 12, 27, 28, 29, 33, 35, 39, 41, 44, 50, 53, 59, 68, 87, 93, 95, 96, 98, 100, 106, 108, 109, 110, 130, 142, 144, 161, 163; C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, 227; C.I. Reactive Yellow 2, 3, 13, 14, 15, 17, 18, 23, 24, 25, 26, 27, 29, 35, 37, 41, 42; and C.I. Basic Yellow 1, 2, 4, 11, 13, 14, 15, 19, 21, 23, 24, 25, 28, 29, 32, 36, 39, 40.

According to the present invention, the density of the colorant contained in the yellow ink composition can be appropriately determined according to the color value of the compounds (dyes) used as the colorant. When at least one substance selected from the group consisting of the dyes of formula (5) and formula (6) is contained in the yellow ink composition, in general, the total amount of the colorant selected from the group is preferably 1.0 to 6.0 wt % of the entire yellow ink composition. With the density of the total amount of the colorant 1.0 wt % or more, the yellow ink composition can obtain good coloring properties, while with the density of the total amount of the colorant 6.0 wt % or less, good discharge ability from the nozzle, which is necessary for an ink composition employed in an inkjet recording method, can be obtained, and clogging of the ink nozzle can be prevented.

In the case of using C.I. Direct Yellow 58 and at least one substance selected from the group consisting of the dyes of formula (5) and formula (6) as the colorants of the yellow ink composition as described above, the ratio of the density (wt %) of the total density (wt %) of the dyes selected from the group consisting of dyes of formula (5) and formula (6) to the C.I. Direct Yellow 58 is preferably 4:1 to 10:1. If this yellow ink composition, whose dyes of formula (5) and formula (6) have outstanding ozone fastness, is combined to make an ink set with other conventional color inks having inferior ozone fastness, it sometimes causes a phenomenon in which, after an ozone exposure test, the respective colors exhibit different levels of fading and the color balance of the image is reduced, thereby one can easily notice the image deterioration. However, if the yellow ink composition is combined with the cyan and magenta inks of the present invention, as well as a black ink if desired, to form an ink set, the ozone fastness of the respective colors is remarkably enhanced, and accordingly, after an ozone exposure test, the color balance of an image is not reduced, and good image quality can be maintained for a long period of time. The combination of C. I. Direct Yellow 58 and the dyes of formula (5) and formula (6) enables adjustment to a more preferable color balance and the good image quality of the printed article can be maintained over a more extended period of time.

Next, a colorant used in the black ink composition, a constituent of the ink set of the present invention is explained. The ink set of the present invention may comprise a black ink composition if desired. The present ink set including a black ink composition can form an image with good contrast on a recording medium.

The black ink composition included in the present ink set preferably contains at least one substance selected from the group consisting of the compounds expressed by formula (7) below:

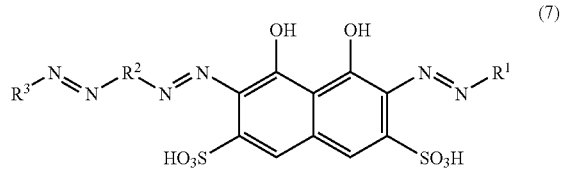

and salts thereof.

In formula (7), $R^1$ represents a phenyl group having a substituent or a naphtyl group having a substituent. Also in the formula, $R^2$ represents a phenylene group having a substituent or a naphtylene group having a substituent. $R^3$ represents a five to seven-member heterocyclic group having at least one double bond and a substituent. The substituents of $R^1$ to $R^3$ independently represent OH, $SO_3H$, $PO_3H_2$, $CO_2H$, $NO_2$, $NH_2$, a $C_{1-4}$ alkyl group, a substituted alkyl group, a $C_{1-4}$ alkoxy group, a substituted alkoxy group, an amino group, a substituted amino group, or a substituted phenyl group.

The aforementioned substituted alkyl group is preferably selected from $C_{1-4}$ alkyl groups substituted with one or more groups selected from the group consisting of OH, $SO_3H$, $PO_3H_2$, $CO_2H$, and $NH_2$ groups. The aforementioned substituted alkoxy group is preferably selected from $C_{1-4}$ alkoxy groups substituted with at least one group selected from the groups consisting of OH, $SO_3H$, $PO_3H_2$, $CO_2H$, and $NH_2$ groups. The aforementioned substituted amino group is preferably selected from amino groups having one or two $C_{1-4}$ alkyl groups which are substituted with one or more groups selected from the group consisting of OH, $SO_3H$, $PO_3H_2$, $CO_2H$, and $NH_2$ groups. The aforementioned substituted phenyl group is preferably selected from phenyl groups having one or two substituents, these substituents are selected from OH, $SO_3H$, $PO_3H_2$, $CO_2H$, $NH_2$, a $C_{1-4}$ alkyl group, and a substituted $C_{1-4}$ alkyl group.

Moreover, it is particularly preferable that the compounds expressed by formula (7) are the compounds expressed by formula (8) below:

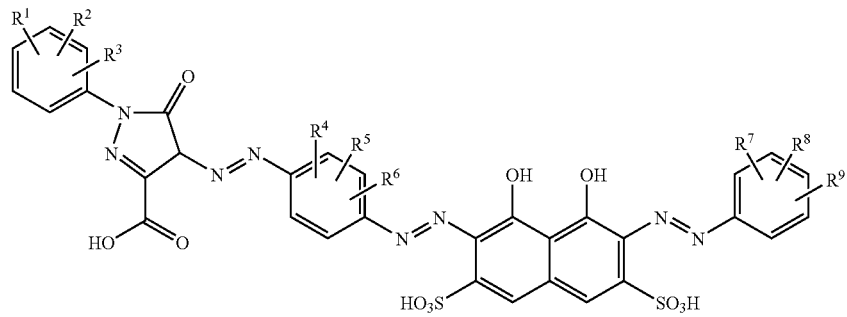
(8)
(In formula (8), each of $R^1$ to $R^9$ independently represents a group selected from the group consisting of H, OH, $SO_3H$, $PO_3H_2$, $CO_2H$, $NO_2$ and $NH_2$.)
As the compounds (7) to be used in the black ink composition of the present ink set, the compounds expressed by formula (10) to formula (16) below are particularly preferable.
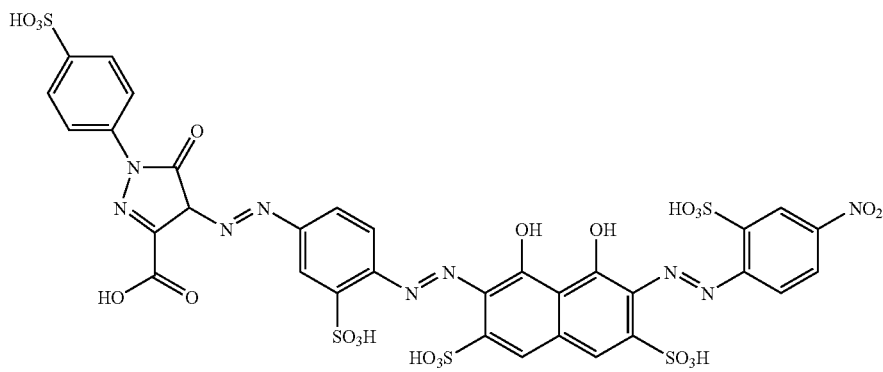
(10)
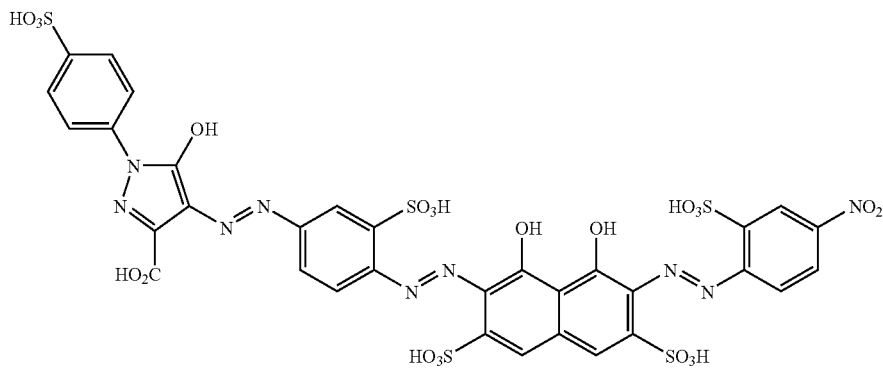
(11)
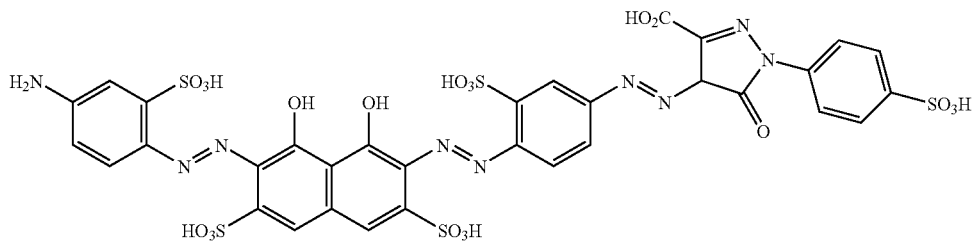
(12)

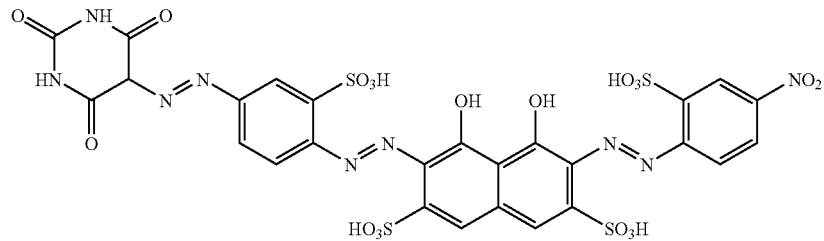
(13)
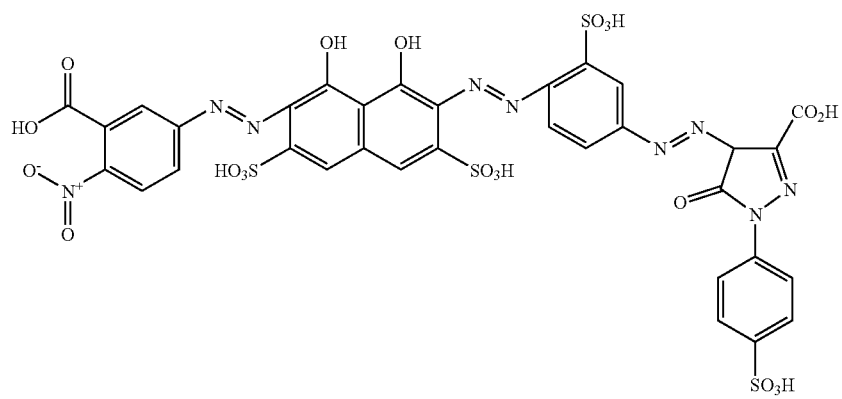
(14)
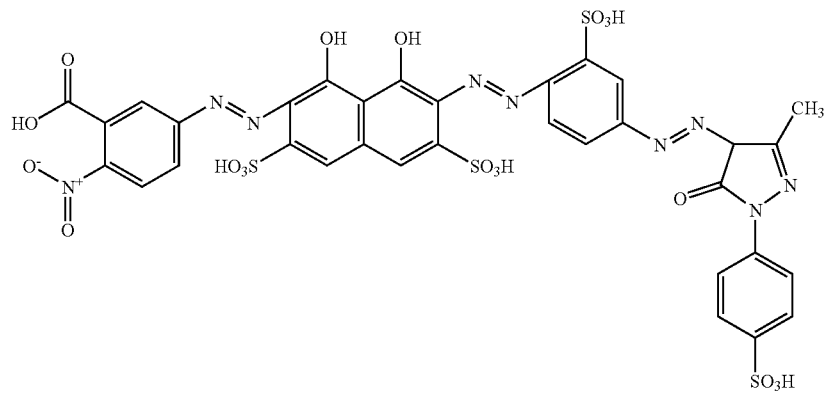
(15)
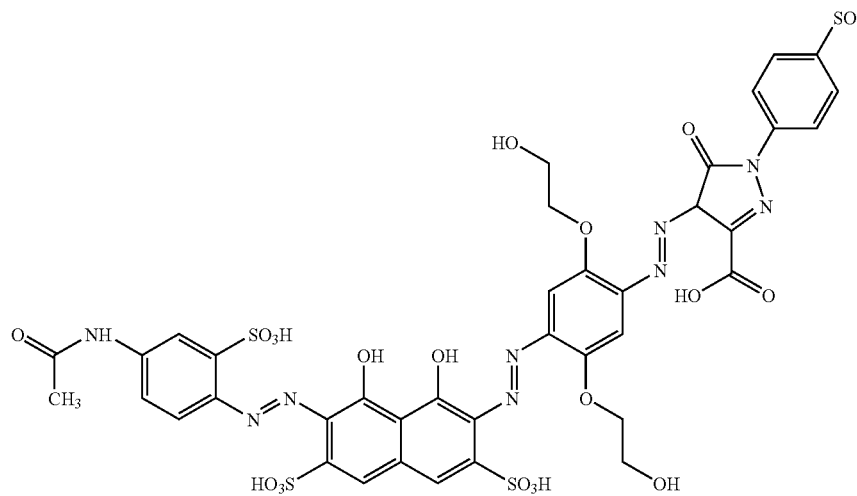
(16)
Each compound expressed by formula (7) used in the black ink composition of the present ink set may be appropriately synthesized by a preferable method. For example, the compound can be synthesized by azo-coupling building blocks that have four corresponding structures bonded by three azo groups. In other words, when the dihydroxynaphthalene framework portion expressed by formula (7) is expressed by Q, the synthesized compound of formula (7) is expressed by $R^3$—N=N—$R^2$—N=N—Q—N=N—$R^1$. To diagrammatically indicate one specific method for synthesizing the compound, first, diazonium salt obtained by diazotizing $R^1$—$NH_2$ is reacted with QH to obtain $R^1$—N=N—QH. Next, the compound obtained by diazotizing $CH_3CON$—$R^2$—$NH_2$ is coupled to $R^1$—N=N—QH to synthesize $R^1$—N=N—Q—N=N—$R^2NCOCH_3$. The obtained compound is then turned into an amino group by removing an acetyl group therein, diazotized, and coupled to $R^3H$ to synthesize $R^1$—N=N—Q—N=N—$R^2$—N=N—$R^3$.

As a specific example of the synthesis, synthesis of the compound expressed by formula (10) is hereinafter explained.

5-acetylamino-2-aminobenzenesulfonic acid (23.0 g, 0.10 mol) was added to water (300 ml) containing concentrated nitric acid (30 ml). Sodium nitrite (6.9 g) at the temperature of 0 to 5° C. was added to the solution over 10 minutes. Sixty minutes later, excessive nitrous acid was decomposed and the resulting diazonium salt solution was slowly added, while maintaining 5 to 10° C. and pH 8 to 9, to a solution where 1,8-dihydroxynaphthalene-3,6-disulfonic acid (32.0 g, 0.10 mol) had been dissolved in water (500 g). The quantitative progression of the reaction was confirmed by HPLC. Thereby, a solution containing a coupling product (referred to as a "dye base") was obtained.

Next, 5-nitro-2-aminobenzenesulfonic acid (43.6 g, 0.20 mol) was added to water (500 g) containing concentrated hydrochloric acid (60 g). Sodium nitrite (13.8 g) at the temperature of 0 to 5° C. was also added over 15 minutes. Sixty minutes later, the resulting diazonium salt solution was added over 120 minutes, with its temperature kept at 5 to 10° C. and pH maintained at 6 to 7, to the aforementioned dye base where tetrahydrofuran (1000 g) had been added in advance. Five hours later, when produced precipitates were gathered and dried with a dryer, dark-red solid matter (55.3 g) was obtained. This dark-red solid matter was dissolved in water (1000 ml) and heated to 80° C. Sodium hydroxide was added to the solution and the temperature was maintained at 80° C. for 8 hours. Eight hours later, the pH of the solution was adjusted to pH 7 to 8 using concentrated hydrochloric acid and the solution was left stand to cool to room temperature. The solution was dialyzed (less than 50 $\mu Scm^{-1}$) using Visking (trademark) tubing, passed through a filter, and dried with a dryer, then 47.2 g of black solid matter was obtained.

The black solid matter obtained above was again dissolved in water with pH 7 to 9. Lithium hydroxide was used to adjust the pH. Then, sodium nitrite (8.3 g) was added and the solution was stirred for 10 minutes. Then, this dye/nitrite solution was added to ice water (100 ml) containing concentrated hydrochloric acid (30 g). The temperature rose up to 15 to 25° C. and the solution was left to stand for three hours in the same state. The resulting diazodium salt solution was added, maintaining its temperature at 15 to 20° C. and the pH at 6 to 7, to a solution of 1-(4-sulfophenyl)-3-carboxy-5-pyrazolone (17.9 g, 0.06 mol) over 120 minutes. The pH of the solution was maintained by adding lithium hydroxide. Subsequently, this solution was dialyzed (less than 50 $\mu Scm^{-1}$) using Visking (trademark) tubing, passed through a filter, and dried with a dryer, thereby resulting in 60.0 g of a compound expressed by formula (10) as black solid matter.

Examples of the salt of the compounds expressed by formula (7) include at least one substance selected from the compound salts containing two or more substances selected from the group consisting of alkali metal salt, ammonium salt, organic ammonium salt, and various metals, ammoniums and organic ammoniums of these salts. Examples of the alkali metal salt include lithium salt, sodium salt, potassium salt, cesium salt, and salts containing two or more of these metals. Lithium salt and sodium salt are particularly preferable as the salts of the compounds expressed by formula (7) used in the black ink composition of the present invention.

The black ink composition of the present invention contains, as a colorant, at least one of the compounds expressed by formula (7) and salts thereof (hereinafter also referred to as the "dye of formula (7)").

The black ink composition included in the present ink set contains, as a colorant, at least one substance selected from the dyes of formula (7) and the total amount of the colorant is preferably 0.5 to 12 wt %, more preferably 1.0 to 9.0 wt % of the entire black ink composition. Within that range, when the black ink composition contains the dyes of formula (7) in an amount of 0.5 wt % or more in total, adequate and desirable coloring properties and high image density can be obtained for images etc. recorded on a recording medium. On the other hand, when the total amount of the dyes of formula (7) contained in the black ink composition is 12 wt % or less, the viscosity of the ink composition can be adjusted to a favorable level, the amount of the ink composition discharged from the ink-jet head can be stabilized, and clogging of the inkjet head can be prevented.

So far, explanations have been given for the colorants and their amounts used in the respective ink compositions of the present invention. Now, other components contained in the respective ink compositions are explained.

The respective ink compositions of the present invention can be obtained by dissolving the aforementioned colorants (dyes) in appropriate solvents. When dissolving the colorants to form the respective ink compositions, it is preferable to use water or a mixture of water and a water-soluble organic solvent as a main solvent. As such water, ion-exchange water, ultrafiltrated water, reverse osmosis water, or distilled water can be used. In terms of long storage, it is preferable to use water that has undergone various chemical sterilization processes such as ultraviolet irradiation or hydrogen peroxide addition. The water content in the respective ink compositions of the present ink set is preferably 40 to 90 wt %, more preferably 50 to 80 wt % of the respective ink composition.

As described immediately above, a water-soluble organic solvent can be used with water as a solvent for the respective ink compositions of the present invention. Among others, water-soluble organic solvents capable of dissolving dyes and having smaller vapor pressure than pure water are preferable. Examples of the water-soluble organic solvent used in the present invention include but are not limited to: polyhydric alcohols such as ethylene glycol, propylene glycol, butanediol, pentanediol, 2-butene-1,4-diol, 2-methyl-2,4-pentanediol, glycerin, 1,2,6-hexanetriol, diethylene glycol, triethylene glycol, dipropylene glycol; ketones such as acetonylaceton; esters such as v-butyrolactone and triethyl phosphate; furfuryl alcohol; tetrahydro furfuryl alcohol; and thiodiglycol. When a water-soluble organic solvent is used with water as a solvent for an ink composition, discharge stability of the ink composition from the ink head can be enhanced, and adjustments such as lowering the viscosity of the ink composition and the like can be easily conducted without changing other properties of the ink composition.

Moreover, at least one type of humectant selected from saccharides may be contained in the respective ink compositions of the present invention. By using ink compositions containing humectants in the inkjet recording method, moisture retention of the inks is provided, and the evaporation of ink moisture can be prevented. Examples of the saccharide to be used in the present invention include maltitol, sorbitol, gluconolctone, maltose, and the like. The aforementioned water-soluble organic solvents may also function as humectants in some cases.

The above water-soluble organic solvents and/or the humectants are preferably contained in the respective ink compositions in a total amount of 5 to 50 wt %, more preferably 5 to 30 wt %, most preferably 5 to 20 wt %. Within that range, when an ink composition contains these substances in an amount of 5 wt % or above, such ink composition has good moisture retention. On the other hand, when an ink composition contains these substances in an amount of 50 wt % or less, the viscosity of the ink composition can be adjusted to a favorable level for usage in the inkjet recording method.

The cyan and/or magenta ink compositions of the present ink set preferably contain at least one substance selected from the naphthalene-based aromatic compounds having a carboxy group at the second position or salts thereof. When at least one substance selected from the naphthalene-based aromatic compounds having a carboxyl group at the second position and the salts thereof is added, bronzing can be prevented in the cyan ink composition and moisture fastness can be enhanced in the magenta ink composition. Bronzing is generally known as a phenomenon in which, when high-duty printing such as solid printing is conducted on an inkjet recording medium (especially a glossy type recording medium) with an ink composition containing a cyan-based dye, printed parts look reddish and displaced. When this phenomenon occurs, it reduces the color balance of the entire image and degrades the image quality, thereby making it impossible to obtain a good image.

Of the naphthalene-based aromatic compounds having a carboxy group at the second position and used in the present invention, alkali metal salts of the naphthalene-based aromatic compounds having a carboxy group at the second position are particularly preferable. Of the alkali metal salts, it is more preferable to use lithium salt. Using the lithium salt has the effect of preventing not only bronzing, but clogging of the inkjet nozzle as well.

Examples of the naphthalene-based aromatic compounds having a carboxyl group at the second position or the salts thereof include 2-naphthoic acid, 1-hydroxy-2-naphthoic acid, 3-hydroxy-2-naphthoic acid, 6-hydroxy-2-naphthoic acid, 4-hydroxybenzoic acid, 2,6-naphthalenedicarboxylic acid, 3-methoxy-2-naphthoic acid, 3-ethoxy-2-naphthoic acid, 3-propoxy-2-naphthoic acid, 6-methoxy-2-naphthoic acid, 6-ethoxy-2-naphthoic acid, 6-propoxy-2-naphthoic acid, and salts thereof, especially lithium salt. Among these, 2-naphthoeic acid and its lithium salt are particularly preferable.

In order to add the naphthalene-based aromatic compounds having a carboxyl group at the second position to the ink compositions, either one of the following methods can be employed: add it in the form of salts; or add the naphthalene-based aromatic compounds having a carboxyl group at the second position, and a base forming a salt with the compound, separately. In the present invention, it is possible to use at least one substance selected from the group consisting of the naphthalene-based aromatic compounds having a carboxyl group at the second position and the salts thereof, but it is also possible to use both a naphthalene-based aromatic compound having a carboxyl group at the second position, and its salt, together.

When the cyan ink composition and/or the magenta ink composition of the present invention contains at least one substance selected from the group consisting of naphthalene-based aromatic compounds having a carboxyl group at the second position and salts thereof (hereinafter referred to as the "naphthalene-based aromatic compounds having a carboxyl group at the second position and the like"), the total amount of the naphthalene-based aromatic compounds having a carboxyl group at the second position and the like is preferably 0.1 to 10 wt %, more preferably 0.5 to 5 wt % of the ink compositions. The content of the naphthalene-based aromatic compounds having a carboxyl group at the second position and the like can be appropriately and favorably determined according to the type of the compounds and the type of the dyes and solvents contained in the ink compositions.

When the naphthalene-based aromatic compounds having a carboxyl group at the second position and the like are added to the cyan ink composition, it is preferable that the ratio of the amount (wt %) of the cyan dye contained in the cyan ink composition to the amount (wt %) of the naphthalene-based aromatic compounds having a carboxyl group at the second position and the like is preferably 1:0.1 to 1:10, more preferably 1:0.3 to 1:6. Within that range, if the content of the cyan dye in the cyan ink composition is regarded as 1 and the content of the naphthalene-based aromatic compound having a carboxyl group at the second position and the like is more than 0.1, the occurrence of bronzing can be reduced. When the content of the naphthalene-based aromatic compounds having a carboxyl group at the second position and the like is less than 10, clogging of the inkjet nozzle can be prevented.

On the other hand, when the naphthalene-based aromatic compounds having a carboxyl group at the second position and the like are added to the magenta ink composition, the ratio of the amount (wt %) of the magenta dye contained in the magenta ink composition to the amount (wt %) of the naphthalene-based aromatic compounds having a carboxyl group at the second position and the like is preferably 1:0.5 to 1:10, more preferably 1:1 to 1:6. Within that range, if the content of the magenta dye in the magenta ink composition is regarded as 1 and the content of the naphthalene-based aromatic compounds having a carboxyl group at the second position and the like is more than 0.5, image deterioration due to blurring under a high-moisture environment can be reduced. When the content is less than 10, clogging of the inkjet nozzle can be prevented.

Now, other preferable additives to the ink compositions constituting the ink set of the present invention are explained.

It is preferable that the ink compositions constituting the present ink set contain a nonionic surfactant. When a nonionic surfactant is contained, the ink compositions penetrate the recording medium excellently and, during printing, the ink compositions are fixed onto the recording medium immediately. It is generally desired that a dot recorded on a recording medium with the ink compositions be almost completely round. When a nonionic surfactant is contained in the ink compositions, the roundness of an image formed with one dot can be enhanced and the quality of the obtained image can be improved.

Preferable examples of the nonionic surfactant used in the present invention include but are not limited to an acetylene glycol-based surfactant. As the acetylene glycol-based surfactant used in the present ink compositions, it is preferable to use a compound expressed by formula (17) below:

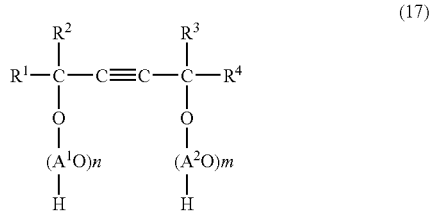
(17)

(In formula (17), each of $R^1$, $R^2$, $R^3$, and $R^4$ independently represents a $C_{1-6}$ straight or cyclic or branched alkyl chain. $A^1O$ and $A^2O$ independently represent a $C_{2-3}$ oxyalkylene chain (for example, oxyethylene or oxypropylene) or a polyoxyalkylene chain obtained when $C_{2-3}$ alkyleneoxides polymerize or copolymerize (for example, a polyoxyethylene chain, a polyoxypropylene chain, or a polyoxyethylenepropylene chain). In the formula, n and m independently represent an $A^1O$ or $A^2O$ unit, that is, a repeat number of oxyalkylene and they satisfy $0 \leq n < 30$, $0 \leq m < 30$, and $0 \leq n+m < 50$.) Examples of the acetylene glycol-based surfactant include Surfynol 465 (trademark), and Surfynol 104 (trademark) (both trade names, manufactured by Air Products and Chemicals Inc.), Olfine PD001 (trademark), and Olfine E1010 (trademark) (both trade names, manufactured by Nisshin Chemical Industry Co., Ltd.). It is preferable that at least one substance selected from the above is added to the ink compositions constituting the present ink set.

In the present invention, the nonionic surfactant is preferably added to the ink composition so that its content is preferably 0.1 to 5 wt %, more preferably 0.5 to 2 wt %. Within that range, when the content of the nonionic surfactant is 0.1 wt % or more, penetration of the respective ink compositions into the recording medium can be enhanced. When the content of the nonionic surfactant in the ink compositions is 5 wt % or less, it is unlikely that the images formed with the ink compositions on the recording medium will blur.

In addition to the nonionic surfactant, a glycol ethers can also be added to the ink compositions as a penetrating agent so that the penetration of the ink compositions on the recording medium is increased and, when color printing is conducted, bleeding of the inks is reduced at the boundaries of adjacent color inks, thereby obtaining a remarkably sharp image. Accordingly, it is preferable to add a penetrating agent to the ink compositions constituting the present ink set.

Examples of the glycol ethers used as the penetrating agent in the present invention include but are not limited to ethylene glycol monobutyl ether, diethylene glycol monobutyl ether, triethylene glycol monoethyl ether, propylene glycol monomethyl ether, dipropylene glycol monoethyl ether, propylene glycol monobutyl ether, dipropylene glycol mono butyl ether, and triethylene glycol monobutyl ether. These glycol ethers are contained in the ink compositions preferably at 3 to 30 wt %, more preferably at 5 to 15 wt %. Within that range, when the added amount of the glycol ethers is 3 wt % or more, bleeding of the adjacent inks can be effectively prevented in color printing. When the amount is 30 wt % or less, it becomes easy to prevent the occurrence of image blurring and the storage stability of the inks can be enhanced.

The ink compositions of the present invention may contain, as desired, components selected from pH modifiers such as triethanolamine and alkali metal hydroxide, water-soluble polymers such as sodium alginate, water-soluble resins, fluorochemical surfactants, preservatives, fungicides, rust-inhibitors, dissolution accelerators, antioxidants, and ultraviolet absorbers. The components may be used singularly or mixed together. These materials may not be added if there is no such necessity. Persons skilled in the art can use preferable additives selected from the above in a preferable amount to the extent that the effect of the present invention is not ruined. The dissolution accelerators refer to additives that, when insoluble matters are deposited from the ink compositions, dissolve the insoluble matters and keep the ink compositions homogeneous.

Examples of the dissolution accelerators include but are not limited to pyrrolidones such as N-methyl-2-pyrrolidone and 2-pyrrolidone; ureas such as urea, thiourea, and tetramethylurea; alohanates such as alohanate and methyl alohanate; and biurets such as biuret, dimethyl biuret and tetramethyl biuret. Examples of the antioxidants include but are not limited to L-ascorbic acid and salts thereof.

Examples of the preservatives or fungicides include but are not limited to sodium benzonate; sodium pentachlorophenol; 2-pyridine thiol-1-sodium oxide; sodium sorbate; sodium dehydroacetate; and 1,2-dibenzine thiazoline-3-one (Proxel CRL, Proxel BND, Proxel GXL, Proxel XL-2, and Proxel TN, all are trade names and are available from Avecia Limited).

Examples of the pH modifiers include but are not limited to amines and transformations thereof such as diethanolamine, triethanolamine, propanolamine, and morpholine; metal hydroxides such as potassium hydroxide, sodium hydroxide, and lithium hydroxide; ammonium salts such as ammonium hydroxide and quaternary ammonium hydroxide (tetramethylammonium, etc.); carbonates such as potassium carbonate, sodium carbonate, and lithium carbonate; and phosphates.

Concerning ink compositions constituting the present ink set that are prepared including components selected appropriately from the aforementioned components, the viscosity of the obtained ink compositions is preferably less than 10 mPa·s at a temperature of 20° C. Moreover, in the present invention, the surface tension of the ink compositions is preferably 45 mN/m or less, more preferably 25 to 45 mN/m at a temperature of 20° C. With the viscosity and the surface tension adjusted to these levels, the resulting ink compositions have advantageous properties for use in the inkjet recording method. Adjustment of the viscosity and the surface tension can be conducted by properly choosing the types of the respective solvents and additives to the ink compositions and adjusting the amount added thereof.

It is preferable that the pH of the ink compositions constituting the present ink set be preferably pH7.0 to 10.5, more preferably pH7.5 to 10.0 at a temperature of 20° C. The ink compositions of pH7.0 or more at 20° C. can prevent exfoliation of the eutectic plating of the inkjet head and stabilize the discharge properties of the ink compositions from the inkjet head. The ink compositions of pH10.5 or less at 20° C. can prevent the deterioration of various parts the ink compositions come into contact with, for example, the parts constituting the ink cartridge and the inkjet head.

In order to dissolve the naphthalene-based aromatic compounds having a carboxyl group at the second group and the like in the magenta and/or cyan ink compositions, it is preferable to set the pH of the ink compositions to pH8.0 or more, at 20° C. In the present invention, the pH value of the ink compositions is measured with a commercially available pH meter, by inserting a pH electrode into the ink compositions.

One example of the preparation method of the present ink compositions is a method in which the respective components contained in the ink compositions are fully mixed and dissolved to be as homogeneous as possible, then the solution is filtered under pressure with a 0.8 μm pore size membrane filter and de-aerated using a vacuum pump. The present invention is not limited to this method.

The present ink set using the above ink compositions has the advantages that it can be used as an ink cartridge housing the ink compositions integrally or separately, and it is easy to handle. Ink cartridges constituted by housing ink sets are publicly known in the field this patent pertains to and such ink sets can be turned into ink cartridges using a well-known method appropriately.

The present ink set or ink cartridge can be used for general writing tools, recording instruments, and pen plotters but it is particularly preferable that it be used in an inkjet recording method. The inkjet recording methods where the present ink set or ink cartridge can be used include any method by which ink compositions are discharged from a thin nozzle in the form of droplets and fixed onto a recording medium. Specific examples of an inkjet recording method using the present ink compositions are explained below.

A first method is a method using a system called electrostatic absorption method. The electrostatic absorption method is a method in which an intense electric field is applied between a nozzle and an accelerating electrode positioned in front of the nozzle, droplet-form ink is ejected continuously from the nozzle, and while the ink droplets are passing between the deflecting electrodes, print information signals are provided to the deflecting electrodes, and the ink droplets are jetted and fixed onto a recording medium, thereby recording images. Or, it is a method in which the ink droplets are not deflected but jetted from the nozzle to a recording medium according to print information signals, thereby fixing and recording images on the recording medium. Preferably, the ink set and ink cartridge of the present invention are used in recording methods employing these electrostatic absorption method.

A second method is a method in which pressure is applied to the ink droplets with a small pump, and an inkjet nozzle is mechanically oscillated using a quartz resonator or the like, thereby jetting the ink droplets from the nozzle with force. The ink droplets are jetted from the nozzle and simultaneously charged, and while the ink droplets are passing between the deflecting electrodes, print information signals are provided to the deflecting electrodes, and the ink droplets are jetted onto a recording medium, thereby recording images on the recording medium. The ink set or the ink cartridge of the present invention is preferably used in this recording method.

A third method is a method in which pressure and print information signals are simultaneously provided to the ink droplets by piezoelectric elements and the ink droplets are jetted from the nozzle onto a recording medium, thereby recording images on the recording medium. The ink set or the ink cartridge of the present invention is preferably used in this recording method.

A fourth method is a method in which the ink droplets are heated to make foam with a microelectrode according to print information signals, and the foam is expanded so that the ink droplets are jetted from the nozzle onto a recording medium, thereby recording images thereon. The ink set and the ink cartridge of the present invention is preferably used in this recording method.

The ink set or the ink cartridge of the present invention provides ink compositions that are particularly preferable to be used for recording images on a recording medium using the image recording methods employing inkjet recording systems including the four methods above. Recorded matters obtained by using the present ink set are excellent in image quality and ozone fastness.

EXAMPLES

The present invention is explained in further detail below, but is not limited to the following examples.

[Preparation of Each Ink Composition]

Based on the compositions shown in Tables 1 and 2 below, the respective components were stirred for 30 minutes at room temperature and the obtained solutions were filtered with 1.0 μm pore size membrane filters, thereby obtaining the respective ink compositions. In Table 1, the numeric value of each component indicates wt % where 100% is considered the total mass of the ink composition. "Residue" indicating an amount of water, refers to the amount that makes 100% in total with the amounts of the other components other than water.

In Tables 1 and 2, C represents a cyan ink composition, M represents a magenta ink composition, Y represents a yellow ink composition, K represents a black ink composition, LC represents a light cyan ink composition, and LM represents a light magenta ink composition.

In Tables 1 and 2, cyan dyes 1 to 3 are examples of the compounds expressed by formula (1) and are the compounds expressed by formula (A) below.

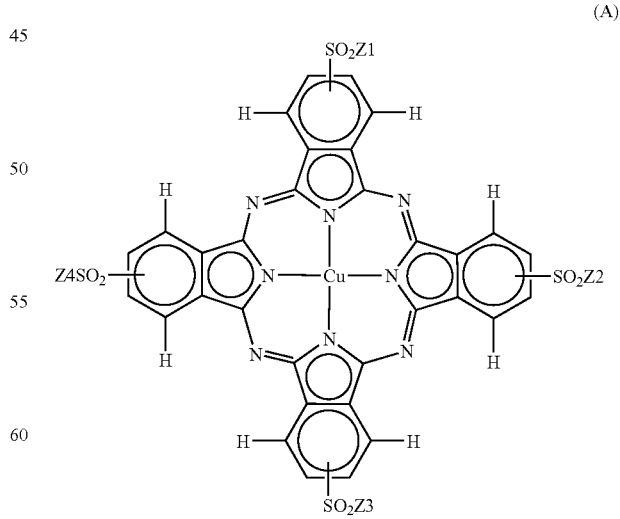

(A)

Z1 to Z4 in cyan dyes 1 to 3 represent the elements shown in Table (A) below.

TABLE A

| | Z1 | Z2 | Z3 | Z4 |
|---|---|---|---|---|
| Cyan dye 1 | —(CH$_2$)$_3$SO$_3$Li | —(CH$_2$)$_3$SO$_3$Li | —(CH$_2$)$_3$SO$_3$Li | —(CH$_2$)$_3$SO$_3$Li |
| Cyan dye 2 | —(CH$_2$)$_3$SO$_3$Li | —(CH$_2$)$_3$SO$_3$Li | —(CH$_2$)$_3$SO$_3$Li | —(CH$_2$)$_3$SO$_2$NHCH$_2$CH(OH)CH$_3$ |
| Cyan dye 3 | —(CH$_2$)$_3$SO$_3$Li | —(CH$_2$)$_3$SO$_3$Li | —(CH$_2$)$_3$SO$_3$Li | —(CH$_2$)$_5$CO$_2$Li |

C.I. Direct Blue 199 was used as a comparative example for the cyan dyes.

In Tables 1 and 2, magenta dye 1 is the compound expressed by formula (B) below, which is an example of the compounds expressed by formula (2).

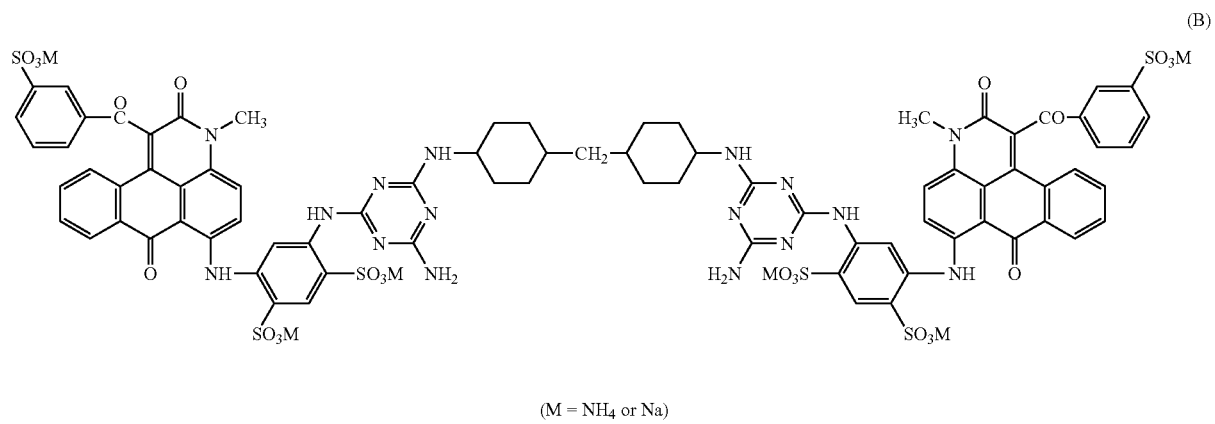

(B)

(M = NH$_4$ or Na)

(In formula (B), M represents NH$_4$ or Na and NH$_4$:Na=1:1 (molar ratio). Magenta dyes 2 and 3 are the compounds expressed by the formula (C) below, which are examples of the compounds expressed by formula (4).

(C)

R1 to R4 in magenta dyes 2 and 3 represent the groups indicated below.

| | R1 | R2 | R3 | R4 |
|---|---|---|---|---|
| Magenta Dye 2 | 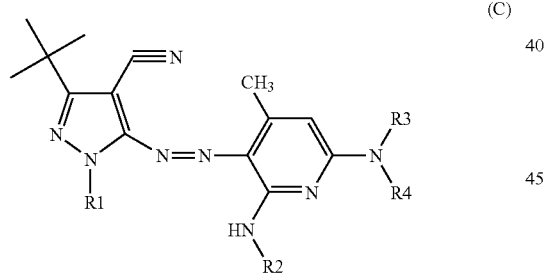 | | | |

-continued

| | R1 | R2 | R3 | R4 |
|---|---|---|---|---|
| Magenta Dye 3 | 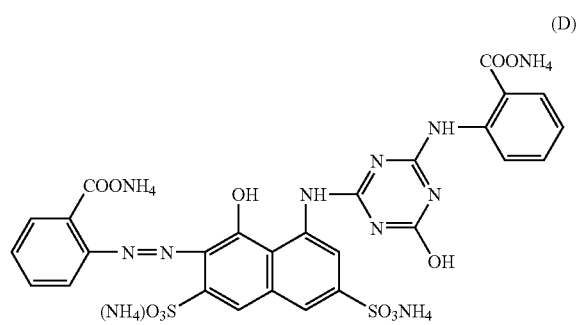 | | | |

The compound expressed by formula (D) below, which is an example of the compounds expressed by formula (9), was used as magenta dye 4.

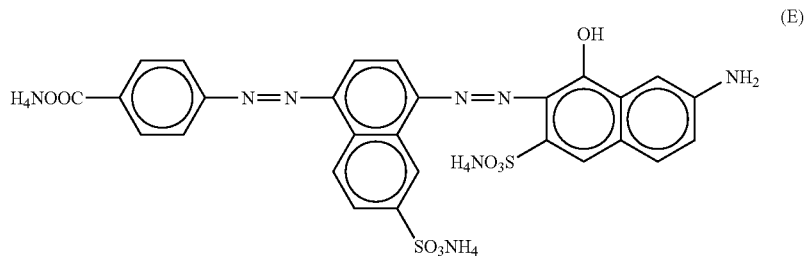

(D)

In addition, C.I. Direct Red 227, commonly used as a magenta dye, was used.

In Tables 1 and 2, C.I Direct Yellow 132 and C.I. Direct Yellow 86 were used as yellow dyes. C.I. Direct Yellow 132 is an example of the compounds expressed by formula (5) and C.I. Direct Yellow 86 is an example of the compounds expressed by formula (6).

In Table 2, the compound expressed by formula (10), which is an example of the compounds expressed by formula (8), was used as black dye 1.

In addition, the compound expressed by formula (E) below:

(E)

which is an ordinary black dye, was used as black dye 2.

TABLE 1

| | Each ink composition's content 1 | | | | | | | | | | | | | |
|---|---|---|---|---|---|---|---|---|---|---|---|---|---|---|
| | C-01 | C-02 | C-11 | C-12 | C-13 | M-01 | M-02 | M-03 | M-11 | M-12 | M-13 | Y-01 | Y-11 | Y-12 | Y-13 |
| Cyan dye 1 | | | 3 | | | | | | | | | | | | |
| Cyan dye 2 | | | | 5 | | | | | | | | | | | |
| Cyan dye 3 | | | | | 4 | | | | | | | | | | |
| C.I. Direct Blue 199 | 3 | 5 | | | | | | | | | | | | | |
| Magenta dye 1 | | | | | | | | | 3 | 3 | 2.5 | | | | |
| Magenta dye 2 | | | | | | | | | | 1 | | | | | |
| Magenta dye 3 | | | | | | | | | | | 0.5 | | | | |
| Magenta dye 4 | | | | | | | | 4 | | | 1 | | | | |
| C.I. Direct Red 227 | | | | | | 3 | 4 | | | | | | | | |
| C.I. Direct Yellow 132 | | | | | | | | | | | | 2 | 1.5 | 3.5 | |
| C.I. Direct Yellow 86 | | | | | | | | | | | | | 1.5 | 1.5 | |
| Direct Yellow 58 | | | | | | | | | | | | 4.5 | | 0.5 | 1 |
| Glycerin | 10 | 5 | 10 | 5 | 10 | 10 | 9 | 8 | 10 | 9 | 8 | 10 | 10 | 10 | 10 |
| Triethylene glycol | 8 | 14 | 8 | 14 | 5 | 6 | 6 | | 6 | 6 | | 5 | 10 | 10 | 5 |
| Propylene glycol | | | | | | | | 5 | | 5 | 5 | | | | 5 |

TABLE 1-continued

Each ink composition's content 1

| | C-01 | C-02 | C-11 | C-12 | C-13 | M-01 | M-02 | M-03 | M-11 | M-12 | M-13 | Y-01 | Y-11 | Y-12 | Y-13 |
|---|---|---|---|---|---|---|---|---|---|---|---|---|---|---|---|
| 1,2-hexanediol | | 1 | | 1 | | 0.5 | 1 | | | 0.5 | 1 | | | | |
| TEGmBE | 10 | 9 | 10 | 9 | 10 | 10 | 9 | 9 | 10 | 9 | 9 | 5 | 10 | 10 | 5 |
| DEGmBE | | | | | | | | | | | | 5 | | | 5 |
| Olfine E1010 (*1) | 1 | | 1 | | 1 | 1 | | | 1 | | | | | | |
| Olfine PD001 (*1) | | | | | | | 1 | | | 1 | | | 1 | 1 | |
| Surfynol 104PG50 (*2) | | 1 | | 1 | | | | 1 | | | 1 | 1 | | | 1 |
| 2-pyrrolidone | | | | | | | 0.5 | 1 | | 0.5 | 1 | | | | |
| Urea | | | | | | 5 | 2 | 2 | 5 | 2 | 2 | | | | |
| Triethanolamine | 0.5 | 0.5 | 0.5 | 0.5 | 0.5 | 0.5 | 0.5 | 0.5 | 0.5 | 0.5 | 0.5 | | 0.1 | 0.1 | |
| LiOH-1 hydrate | | 0.7 | | 0.7 | | | 1 | 1 | | 1 | 1 | | | | |
| 2-naphthoic acid | | 2 | | 2 | | | 3 | 3 | | 3 | 3 | | | | |
| EDTA | 0.02 | 0.02 | 0.02 | 0.02 | 0.02 | 0.02 | 0.02 | 0.02 | 0.02 | 0.02 | 0.02 | 0.02 | 0.02 | 0.02 | 0.02 |
| Benzotriazole | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 |
| Proxel XL-2 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| Water | residue | residue | residue | residue | residue | residue | residue | residue | residue | residue | Residue | Residue | residue | residue | residue |

Unit: wt %

(*1) Made by Nisshin Chemical Industry Co., Ltd.
(*2) Made by Air Products and Chemicals, Inc.

TABLE 2

Each ink composition's content 2

| | K-01 | K-11 | LC-01 | LC-02 | LC-11 | LC-12 | LC-13 | LM-01 | LM-02 | LM-03 | LM-11 | LM-12 | LM-13 |
|---|---|---|---|---|---|---|---|---|---|---|---|---|---|
| Cyan dye 1 | | | | | 1 | | | | | | | | |
| Cyan dye 2 | | | | | | 1.5 | | | | | | | |
| Cyan dye 3 | | | | | | | 1.5 | | | | | | |
| C.I. Direct Blue 199 | | | 1 | 1.5 | | | | | | | | | |
| Magenta dye 1 | | | | | | | | | | | 2 | 1 | 0.5 |
| Magenta dye 2 | | | | | | | | | | | | 0.5 | |
| Magenta dye 3 | | | | | | | | | | | | | 0.5 |
| Magenta dye 4 | | | | | | | | | | 1 | | | |
| C.I. Direct Red 227 | | | | | | | | 2 | 1.5 | | | | |
| Black dye 1 | | 6 | | | | | | | | | | | |
| Black dye 2 | 6 | | | | | | | | | | | | |
| Glycerin | 8 | 8 | 10 | 10 | 10 | 10 | 10 | 10 | 10 | 10 | 10 | 10 | 10 |
| Triethylene glycol | 2 | 2 | 12 | 10 | 12 | 10 | 10 | 9 | 7 | | 9 | 7 | |
| Propylene glycol | | | | | | | | | | 7 | | | 7 |
| 1,2-hexanediol | | 1 | | 1 | | 1 | 1 | | 1 | | | 1 | |
| TEGmBE | | | 10 | 9 | 10 | 9 | 10 | 10 | 9 | 5 | 10 | 9 | 5 |
| DEGmBE | 10 | 10 | | | | | | | | 5 | | | 5 |
| Olfine E1010 (*1) | | | 1 | | 1 | | | 1 | | | 1 | | |
| Olfine PD001 (*1) | 0.5 | | | | | | 1 | | 1 | | | | 1 |
| Surfynol 104PG50 (*2) | | 1 | | 1 | | 1 | | | 1 | | | 1 | |
| 2-pyrrolidone | 3 | 3 | | 3 | | 3 | 3 | | 3 | 3 | | 3 | 3 |
| Urea | | | 1 | 1 | 1 | 1 | | | | | | | |
| Triethanolamine | 0.5 | 0.5 | 0.2 | 0.2 | 0.2 | 0.2 | 0.2 | 0.5 | 0.5 | 0.5 | 0.5 | 0.5 | 0.5 |
| LiOH-1 hydrate | | | | | | | | | | | | 0.7 | 0.7 |
| 2-naphthoic acid | | | | | | | | | | | | 2 | 2 |
| EDTA | 0.05 | 0.05 | 0.02 | 0.02 | 0.02 | 0.02 | 0.02 | 0.02 | 0.02 | 0.02 | 0.02 | 0.02 | 0.02 |
| Benzotriazole | 0.01 | 0.01 | 0.01 | 0.01 | 0.01 | 0.01 | 0.01 | 0.01 | 0.01 | 0.01 | 0.01 | 0.01 | 0.01 |
| Proxel XL-2 | 0.3 | 0.3 | 0.3 | 0.3 | 0.3 | 0.3 | 0.3 | 0.3 | 0.3 | 0.3 | 0.3 | 0.3 | 0.3 |
| Water | residue | residue | residue | residue | residue | residue | residue | residue | Residue | Residue | residue | residue | residue |

Unit: wt %

(*1) Made by Nisshin Chemical Industry Co., Ltd.
(*2) Made by Air Products and Chemicals, Inc.

Next, ink sets for Examples 1 to 5 and Comparable Examples 1 to 5 were prepared with the ink compositions prepared above in the combinations shown in Table 3. The ink sets having the combinations shown in Table 3 do not include the light ink compositions, i.e., the light magenta ink composition and the light cyan ink composition.

TABLE 3

| | Cyan | Magenta | Yellow | Black |
|---|---|---|---|---|
| Example 1 | C-11 | M-11 | Y-11 | — |
| Example 2 | C-12 | M-12 | Y-12 | — |

TABLE 3-continued

|  | Cyan | Magenta | Yellow | Black |
|---|---|---|---|---|
| Example 3 | C-13 | M-13 | Y-13 | — |
| Example 4 | C-11 | M-12 | Y-13 | K-11 |
| Example 5 | C-12 | M-11 | Y-12 | K-11 |
| Comparative Example 1 | C-01 | M-01 | Y-01 | — |
| Comparative Example 2 | C-02 | M-02 | Y-11 | — |
| Comparative Example 3 | C-11 | M-03 | Y-12 | K-11 |
| Comparative Example 4 | C-02 | M-13 | Y-13 | K-01 |
| Comparative Example 5 | C-01 | M-02 | Y-01 | K-01 |

With the respective ink sets shown in Table 3 and a Stylus Color 880 (trademark) inkjet printer (Trade name, manufactured by Seiko Epson Corporation), recorded matters were obtained by printing on inkjet recording media (PM photo papers (Trade name) manufactured by Seiko Epson Corporation)) solid images composed of yellow, magenta, cyan and black (black obtained only in cases where the ink set included a black ink) in a manner that the optical density (OD) values of the respective colors were adjusted to within the range of 0.9 to 1.1. For each recorded matter, an ozone fastness test was conducted as follows:

[Ozone Fastness Test Method]

With Ozone Weather Meter OMS-H (Trade name, manufactured by Suga Test Instruments Co., Ltd.), the recorded matters were exposed to ozone of concentration 20 ppm under the conditions of 24° C. and 64% RH. OD values were measured with a densitometer (Sepctrolino (trademark), manufactured by Gretag) for the respective colors recorded on each of the recorded matters at regular time intervals after the exposure had started. The measurement conditions were: a light source of D50 and a view angle of 2 degrees. Measurements were conducted using a particular filter for each color, that is, a red filter for cyan, a green filter for magenta, and a blue filter for yellow. No filter was used for the color black. From the obtained results, the residual optical densities (RODs) were calculated using the following equation:

$$ROD\ (\%) = (D/D_0) \times 100$$

(In this equation, D represents the OD value after the exposure test and $D_o$ represents the OD value before the exposure test.)

Based on the results of the above tests, the ozone fastness of each color recorded on each recorded matter was ranked between A to E and X according to the following criteria.

[Criteria]

Evaluation A: ROD remained 70% or more 24 hours after the start of the test.

Evaluation B: ROD fell to 70% 12 to 24 hours after the start of the test.

Evaluation C: ROD fell to 70% 6 to 12 hours after the start of the test.

Evaluation D: ROD fell to 70% within 6 hours after the start of the test.

In this test, recorded matters whose RODs decrease only a small degree after long hours of ozone exposure are judged excellent. The results are shown in Table 4.

Furthermore, from the ozone fastness test results of the respective colors, the ozone fastness of the respective ink sets were ranked according to the following criteria.

[Criteria]

Evaluation A: The three colors (or four colors, including black) were evaluated as A in the ozone fastness test results.

Evaluation B: One or more of the three colors (or four colors, including black) were evaluated as B and the rest were all evaluated as A in the ozone fastness test results.

Evaluation C: One or more of the three colors (or four colors, including black) were evaluated as C and the rest were all evaluated as A or B in the ozone fastness test results.

Evaluation D: One or more of the three colors (or four colors, including black) were evaluated as D in the ozone fastness test results.

In this evaluation, evaluation A is most excellent and evaluation B comes next. The results are indicated in "The ozone fastness of the ink sets" of Table 4.

The difference (balance) in ozone exposure-caused ROD change between the respective colors on a recorded matter was evaluated for each ink set according to the following criteria.

[Criteria]

Evaluation A: The gap between the highest ROD and the lowest ROD among the respective colors' RODs (hereinafter simply referred to as the "ROD gap" in the explanation of this evaluation method) is less than 15 points (15%) even 24 hours after the start of the test.

Evaluation B: The Rod gap became 15 points 12 to 24 hours after the start of the test.

Evaluation C: The ROD gap became 15 points 6 to 12 hours after the start of the test.

Evaluation D: The ROD gap became 15 points within 6 hours of the start of the test.

In this evaluation, recorded matters having a small ROD gap are judged excellent. The evaluation results are shown in "Color balance" of Table 4.

Evaluations of bronzing and moisture fastness were also conducted as follows:

[Bronzing Evaluation]

With the respective ink sets of Examples 1 to 5, solid printing of cyan and blue (cyan+magenta) was conducted onto inkjet recording media (PM photo papers) in a manner that the amount of ink deposited would be 1.5 to 2.2 mg/square inch. Glossiness was measured for each of the obtained printed articles (at a measuring angle of 60 degrees) using a gloss meter (PG-1M manufactured by Nippon Denshoku Industries Co., Ltd.). Printing was conducted in two environments, an environment of 20° C. and 48% RH and an environment of 35° C. and 60% RH. Based on evaluation values calculated in the following equation using the obtained glossiness, the extent of the occurrence of bronzing was judged for the respective ink sets. Bronzing evaluation was conducted according to the following criteria.

Elevation value=glossiness (printed article)−glossiness (recording medium)

[Criteria]

Evaluation A: Elevation value Less than 15

Evaluation B: Elevation value 15 or more but less than 35

Evaluation C: Elevation value 35 or more but less than 55

Evaluation D: Elevation value 55 or more

The results are shown in "Bronzing fastness" of Table 4.

[Moisture Fastness Evaluation]

Using the respective ink sets of Examples 1 to 5, red, green and blue letters composed by magenta+yellow, yellow+cyan, and cyan+magenta respectively, and outline letters (white letters on solid images of each color) were printed on inkjet recording media (PM photo papers, gloss papers, and exclusive gloss films all manufactured by Seiko Epson Corporation). The printed letters were left out of the light in an environment of 40° C. and 85% RH. After 7 days, the extent of blurring of the colored letters and the outline letters was observed visually and the moisture fastness was measured based on the following criteria:

[Criteria]

Evaluation A: No blurring found in the images.
Evaluation B: The contours of the images blurred very slightly but not at a disturbing level.
Evaluation C: The contours of the images blurred slightly but the letters could be recognized clearly.
Evaluation D: Heavy blurring. It was almost impossible to read the outline letters because the inks blurred into the white parts.

The results are shown in "Moisture fastness" of Table 4.

TABLE 5

Combinations of ink compositions for the ink sets of Examples 6 to 12 and Comparative Examples 6 to 10

| | Cyan | Magenta | Yellow | Light Cyan | Light Magenta | Black |
|---|---|---|---|---|---|---|
| Example 6 | C-11 | M-11 | Y-12 | LC-11 | LM-11 | — |
| Example 7 | C-12 | M-13 | Y-11 | LC-12 | LM-12 | — |
| Example 8 | C-11 | M-13 | Y-13 | LC-13 | LM-13 | — |
| Example 9 | C-02 | M-03 | Y-13 | LC-12 | LM-11 | — |
| Example 10 | C-12 | M-12 | Y-12 | LC-12 | LM-11 | K-11 |
| Example 11 | C-13 | M-13 | Y-13 | LC-11 | LM-13 | K-11 |
| Example 12 | C-01 | M-02 | Y-12 | LC-13 | LM-12 | K-11 |
| Comparative Example 6 | C-03 | M-01 | Y-01 | LC-01 | LM-01 | — |
| Comparative Example 7 | C-12 | M-12 | Y-13 | LC-02 | LM-02 | — |
| Comparative Example 8 | C-02 | M-01 | Y-01 | LC-01 | LM-03 | K-01 |
| Comparative Example 9 | C-11 | M-11 | Y-11 | LC-02 | LM-01 | K-01 |
| Comparative Example 10 | C-01 | M-12 | Y-12 | LC-02 | LM-11 | K-11 |

TABLE 4

Results of ozone fastness tests etc. of the recorded matters formed with the ink sets of Examples 1 to 5 and Comparative Examples 1 to 5

| | Ozone fastness of single color | | | | Ink set | | | |
|---|---|---|---|---|---|---|---|---|
| | Cyan | Magenta | Yellow | Black | Ozone fastness | Color balance | Bronzing fastness | Moisture fastness |
| Example 1 | A | A | A | — | A | A | B | B |
| Example 2 | A | A | A | — | A | A | A | A |
| Example 3 | A | B | B | — | B | A | B | A |
| Example 4 | A | A | B | A | B | A | B | A |
| Example 5 | A | A | A | A | A | A | A | B |
| Comparative Example 1 | D | D | D | — | D | A | | |
| Comparative Example 2 | D | D | A | — | D | D | | |
| Comparative Example 3 | A | D | A | A | D | D | | |
| Comparative Example 4 | D | B | B | D | D | C | | |
| Comparative Example 5 | D | D | D | D | D | A | | |

[Making of Recorded Matters with a Combination of Dark and Light Inks]

Using the ink compositions having the compositions shown in Tables 1 and 2 in combinations shown in Table 5 below, ink sets for Examples 6 to 12 and Comparable Examples 6 to 10 were prepared. With the respective ink sets and the inkjet printer PM930C (Trade name, manufactured by Seiko Epson Corporation, solid images composed of yellow, magenta, cyan, light cyan, light magenta, and black (black used only when an ink set included a black ink composition) were printed on inkjet recording media (PM photo papers (Trade name) manufactured by Seiko Epson Corporation) such that the OD values of each color were adjusted to in the range of 0.9 to 1.1. Thereby, the recorded matters were obtained.

[Ozone Fastness Test]

For the respective recorded matters printed using the ink sets of Example 6 to 12 and Comparable Examples of 6 to 10, the ozone fastness test was conducted based on the ozone fastness test method described above and the ozone fastness evaluation was conducted according to the aforementioned criteria. The results are shown in Table 6.

[Bronzing Evaluation]

Bronzing was evaluated in Examples 6 to 12 according to the blonzing evaluation method and criteria described above. The results are shown in Table 6.

[Moisture Fastness Evaluation]

The moisture fastness test was conducted for Examples 6 to 12 based on the moisture fastness evaluation method described above and evaluation was conducted according to the above criteria. The results are shown in Table 6.

TABLE 6

|  | Ozone fastness of single color |  |  |  | Ink set |  |  |  |
|---|---|---|---|---|---|---|---|---|
|  | Cyan | Magenta | Yellow | Black | Ozone fastness | Color balance | Bronzing fastness | Moisture fastness |
| Example 6 | A | A | A | — | A | A | B | A |
| Example 7 | A | B | A | — | B | B | A | A |
| Example 8 | B | B | B | — | B | A | B | A |
| Example 9 | C | B | B | — | C | A | A | B |
| Example 10 | A | A | A | A | A | A | A | B |
| Example 11 | B | B | B | A | B | B | B | A |
| Example 12 | B | C | A | A | C | B | B | A |
| Comparative Example 6 | D | D | D | — | D | A |  |  |
| Comparative Example 7 | D | D | B | — | D | C |  |  |
| Comparative Example 8 | D | D | D | D | D | A |  |  |
| Comparative Example 9 | D | D | A | D | D | D |  |  |
| Comparative Example 10 | D | A | A | A | D | D |  |  |

[Effects of the Invention]

Because the ink set of the present invention uses the compounds expressed by formula (1) and salts thereof (hereinafter also referred to as "the dyes of formula (1)" altogether) as the colorants of the cyan ink composition, and the compounds expressed by formula (2) and salts thereof (hereinafter referred to as "the dyes of formula (2)" altogether) as the colorants of the magenta ink composition, the images recorded with the ink set on recorded matters have excellent ozone fastness. Moreover, in cases where the ink set includes dark and light cyan ink compositions for the cyan ink composition, the dyes of formula (1) are used as the colorants in at least one of the dark and light cyan ink compositions—the light cyan ink composition in particular—so that the images printed with such ink set have excellent ozone fastness. Also, in cases where the ink set includes dark and light magenta ink compositions for the magenta ink composition, the dyes of formula (2) are used as the colorants in at least one of the dark and light magenta ink compositions—the light magenta ink composition in particular—so that the images printed with such ink set have excellent ozone fastness. Moreover, when at least one substance selected from the groups consisting of the compounds expressed by formula (5) (hereinafter also referred to as "the dyes of formula (5)") and the compounds expressed by formula (6) (hereinafter also referred to as "the dyes of formula (6)") is used as the dye for the yellow ink composition of the present ink set, or when C.I. Direct Yellow 58 is used together with that substance, the images printed with such ink set can have excellent ozone fastness. The present ink set may further include a black ink composition and when the black ink composition contains, as a colorant, the compounds expressed by formula (7) and salts thereof (hereinafter referred to as "the dyes of formula (7)" altogether), especially the compounds expressed by formula (8) and salts thereof (hereinafter referred to as "the dyes of formula (8)" altogether), the resulting images have excellent contrast and excellent ozone fastness. Furthermore, when at least one substance selected from the group consisting of the naphthalene-based aromatic carboxylic acids having a carboxyl group at the second position and salts thereof, is added to the to the cyan ink composition and/or the magenta ink composition, it is possible to prevent the occurrence of bronzing and enhance moisture fastness. Further, when nonionic surfactants—in particular, acetylene glycol-based surfactants—are added to the ink compositions, and/or when penetrating agents—in particular, glycol ethers—are added to the ink compositions, the quality of the printed images can be enhanced. The ink set of the present invention is preferable as an ink set for the inkjet recording method. Recorded matters made with the present ink set have excellent image quality and excellent ozone fastness.

What is claimed is:

1. An ink set comprising at least a yellow ink composition, a magenta ink composition, and a cyan ink composition, wherein the cyan ink composition contains, as a cyan dye, at least one substance selected from the group consisting of compounds expressed by formula (1) below:

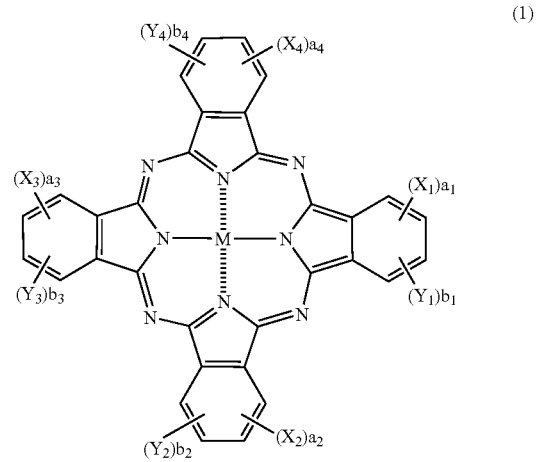

(1)

and salts thereof, wherein in formula (1), each of $X_1$, $X_2$, $X_3$ and $X_4$ independently represents —SO—Z or —SO$_2$—Z; each Z independently represents a substituted or non-substituted alkyl group, a substituted or non-substituted cycloalkyl group, a substituted or non-substituted alkenyl group, a substituted or non-substituted aralkyl group, a substituted or non-substituted aryl group, or a substituted or non-substituted heterocyclic;

each of $Y_1$, $Y_2$, $Y_3$ and $Y_4$ independently represents a hydrogen atom, a halogen atom, an alkyl group, a cycloalkyl group, an alkenyl group, an aralkyl group, an aryl group, a heterocyclic group, a cyano group, a hydroxy group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamide group, a carbamoyl group, a alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, or an ionic hydrophilic group wherein each group may further have a substituent;

$a_1$ to $a_4$ and $b_1$ to $b_4$ represent the number of substituents of $X_1$ to $X_4$ and $Y_1$ to $Y_4$ respectively; each of $a_1$ to $a_4$ independently represents an integer 0 to 4, but all of them cannot be 0 at the same time; each of $b_1$ to $b_4$ independently represents an integer of 0 to 4;

M represents a hydrogen atom, a metal atom or an oxide thereof, a hydroxide, or a halide;

wherein at least one of $X_1$, $X_2$, $X_3$, $X_4$, $Y_1$, $Y_2$, $Y_3$, and $Y_4$ is an ionic hydrophilic group or a group having an ionic hydrophilic group as a substituent; and the magenta ink composition contains, as a colorant, at least one substance selected from the group consisting of compounds expressed by formula (2) below:

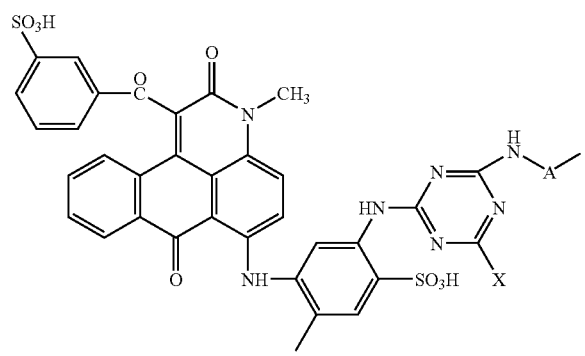

(2)

-continued

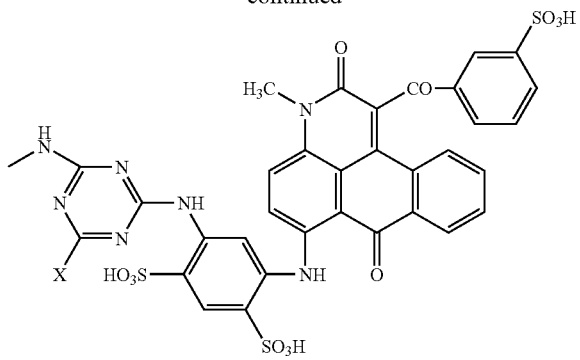

and salts thereof, wherein in formula (2), A represents an alkylene group, an alkylene group containing a phenylene group, or a group expressed by formula (3) below:

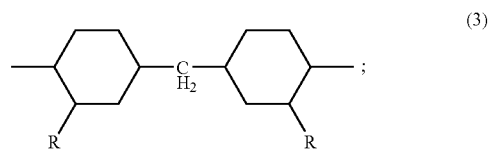

(3)

R represents hydrogen or an alkyl group and X represents a group selected from the group consisting of NH$_2$, OH and Cl.

2. The ink set according to claim 1, wherein in the compounds expressed by formula (1), M represents a copper atom;

$X_1$, $X_2$, $X_3$ and $X_4$ independently represent —SO$_2$Z;

Z represents $R^5$ wherein $R^5$ represents —(CH$_2$)$_3$SO$_3$M$^2$ and M$^2$ represents an alkaline metal atom and/or $R^6$ wherein $R^6$ represents —(CH$_2$)$_3$SO$_2$NHCH$_2$CH(OH)CH$_3$;

$Y_1$, $Y_2$, $Y_3$ and $Y_4$ represent hydrogen atoms;

$a_1$, $a_2$, $a_3$, and $a_4$ are 0 or 1 respectively;

two or more of $a_1$, $a_2$, $a_3$ and $a_4$ are 1; and each of $b_1$, $b_2$, $b_3$, and $b_4$ is an integer that results in a sum of 4 when added to $a_1$, $a_2$, $a_3$, and $a_4$ respectively.

3. The ink set according to claim 2, wherein the M$^2$ is Li.

4. The ink set according to claim 2 wherein, the cyan dye is a mixture of tetrasulfonate, trisulfonate, and disulfonate, each compound expressed by formula (1), wherein each "Z" in the compounds is independently selected from $R^5$ or $R^6$, and the molar ratio of $R^5$ and $R^6$ contained in the entire cyan dye is $R^5/R^6=3/1$.

5. The ink set according to claim 1, comprising in the cyan ink composition, at least one substance selected from the group consisting of the compounds expressed by formula (1) and the salts thereof as a colorant, and the total amount of the colorant being 1.0 to 10 wt % of the entire cyan ink composition.

6. The ink set according to claim 1, comprising in the magenta ink composition, at least one substance selected from the group consisting of the compounds expressed by formula (2) and the salts thereof as a colorant, wherein the total amount of the colorant is 2.0 to 10.0 wt % of the entire magenta ink composition.

7. The ink set according to claim 1, wherein the magenta ink composition further comprises, as a colorant, at least one substance selected from the group consisting of compounds expressed by formula (4) below:

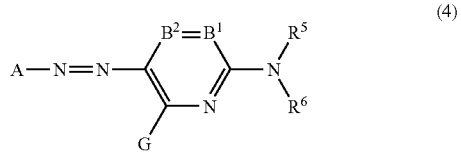

and salts thereof, wherein
in formula (4), A represents a residue of a five-member heterocyclic diazo component A-NH$_2$ B$^1$ and B$^2$ represent —CR$^1$= and —CR$^2$= respectively, or one of them represents a nitrogen atom and the other represents —CR$^1$= or —CR$^2$=; each of R$^5$ and R$^6$ independently represents a hydrogen atom, an alkyl group, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, an arylsulfonyl group, or a sulfamoyl group; each group may further comprise a substituent; each of G, R$^1$, and R$^2$ independently represents a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted by an alkyl group, an aryl group or a heterocyclic group, an acylamino group, a ureide group, a sulfamoylamino group, an alkoxycarbonylamino group, an aryloxycarbonylamino group, an alkyl and arylsulfonylamino group, a nitro group, an alkyl and arylthio group, an alkyl and arylsulfonyl group, an alkyl and arylsulfonyl group, a sulfamoyl group, a sulfo group, or a heterocyclic thio group; each group may further be substituted and R$^1$ and R$^5$, or R$^5$ and R$^6$ may be bonded to form a five to six-member ring.

8. The ink set according to claim 1, comprising as the cyan ink composition, two types of cyan ink compositions of different color densities, wherein at least one of the cyan ink compositions comprises at least one substance selected from the group consisting of the compounds expressed by formula (1) and the salts thereof.

9. The ink set according to claim 8, wherein of the two types of cyan ink compositions of different color densities, the low color density cyan ink composition contains at least one substance selected from the group consisting of the compounds expressed by formula (1) and the salts thereof as a colorant, and the total amount of the colorant is 0.4 to 3.0 wt % of the entire low color density cyan ink composition.

10. The ink set according to claim 8, wherein of the two types of cyan ink compositions of different color densities, the high color density cyan ink composition contains at least one substance selected from the group consisting of the compounds expressed by formula (1) and the salts thereof as a colorant, and the total amount of the colorant is 2.0 to 10.0 wt % of the entire high color density cyan ink composition.

11. The ink set according to claim 8, wherein in the two types of cyan ink compositions of different color densities, the ratio of the density (wt %) of the colorant contained in the low color density cyan ink composition to the density (wt %) of the colorant contained in the high color density cyan ink composition is in the range of 1:2 to 1:8.

12. The ink set according to claim 1, wherein the cyan ink composition comprises at least one substance selected from the group consisting of naphthalene-based aromatic compounds having a carboxyl group at the second position and salts thereof.

13. The ink set according to claim 12, wherein the salts of the naphthalene-based aromatic compounds having a carboxyl group at the second position are lithium salts.

14. The ink set according to claim 1, comprising as the magenta ink composition, two types of magenta ink compositions of different color densities, wherein at least one of the magenta ink compositions comprises at least one substance selected from the group consisting of the compounds expressed by formula (2) and the salts thereof.

15. The ink set according to claim 14, wherein of the two types of magenta ink compositions of different color densities, the low color density magenta ink composition contains at least one substance selected from the group consisting of the compounds expressed by formula (2) and the salts thereof as a colorant, and the total amount of the colorant is 0.5 to 3.5 wt % of the entire low color density magenta ink composition.

16. The ink set according to claim 14, wherein of the two types of the magenta ink compositions of different color densities, the high color density magenta ink composition contains at least one substance selected from the group consisting of the compounds expressed by formula (2) and the salts thereof as a colorant, and the total amount of the colorant is 3 to 10 wt % of the entire high color density magenta ink composition.

17. The ink set according to claim 14, wherein in the two types of magenta ink compositions of different color densities, the ratio of the density (wt %) of the colorant contained in the low color density magenta ink to the density (wt %) of the colorant contained in the high color density magenta ink is in the range of 1:2 to 1:8.

18. The ink set according to claim 1, comprising in the magenta ink composition, at least one substance selected from the group consisting of naphthalene-based aromatic compounds having a carboxyl group at the second position and salts thereof.

19. The ink set according to claim 18, wherein the salts of the naphthalene-based aromatic compounds having a carboxyl group at the second position are lithium salts.

20. The ink set according to claim 1, wherein the yellow ink composition contains at least one substance selected from the group consisting of compounds expressed by formula (5) and formula (6) below as a colorant:

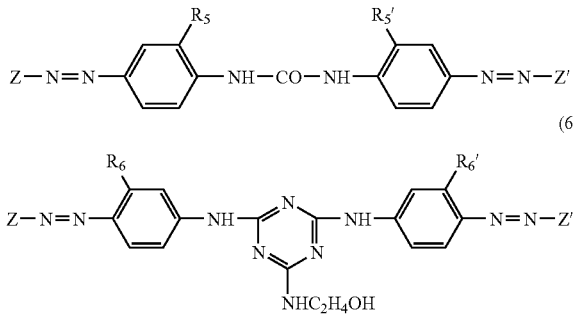

wherein in formula (5) and formula (6), each of $R_5$, $R_5'$, $R_6$, and $R_{6'}$ independently represents $CH_3$ or $OCH_3$, and each of Z and Z' independently has any of the following structures:

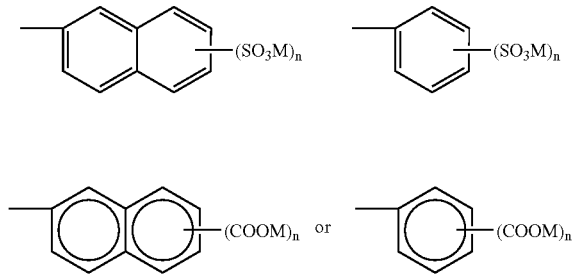

and their structures may be the same or different; here, M represents H, Li, Na, K, ammonium, or organic amines, and n represents an integer 1 or 2.

21. The ink set according to claim 20, wherein the yellow ink composition contains at least one substance selected from the group consisting of the compounds expressed by formula (5) and formula (6) as a colorant, and the total amount of the colorant is 1 to 6 wt % of the entire yellow ink composition.

22. The ink set according to claim 20, wherein the yellow ink composition further contains C.I. Direct Yellow 58 as a colorant.

23. The ink set according to claim 22, wherein, in the yellow ink composition, the ratio of the density (wt %) of C.I. Direct Yellow 58 to the total density (wt %) of compounds selected from the group consisting of the compounds expressed by formula (5) and formula (6), is in the range of 4:1 to 10:1.

24. The ink set according to claim 1, further comprising a black ink composition.

25. The ink set according to claim 24, wherein the black ink composition contains, as a black dye, at least one substance selected from the group consisting of compounds expressed by formula (7) below:

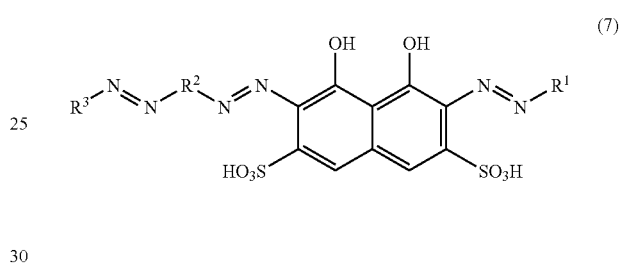

and salts thereof, wherein in formula (7), $R^1$ represents a phenyl group having a substituent or a naphthyl group having a substituent, $R^2$ represents a phenylene group having a substituent or a naphthylene group having a substituent, and $R^3$ represents a five to seven-member heterocyclic group having at least one double bond and a substituent wherein the substituents in $R^1$ to $R^3$ are selected from the group consisting of OH, $SO_3H$, $PO_3H_2$, $CO_2H$, $NO_2$, $NH_2$, a $C_{1-4}$ alkyl group, an alkyl group having a substituent, a $C_{1-4}$ alkoxy group, an alkoxy group having a substituent, an amino group, an amino group having a substituent, and a phenyl group having a substituent.

26. The ink set according to claim 25, wherein the compounds expressed by formula (7) are compounds expressed by formula (8) below:

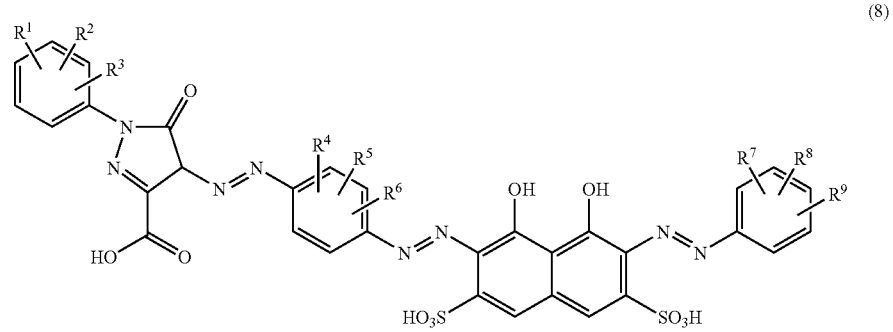

wherein in formula (8), each of $R^1$ to $R^9$ independently represents a group selected from the group consisting of H, OH, $SO_3H$, $PO_3H_2$, $CO_2H$, $NO_2$, and $NH_2$.

27. The ink set according to claim 25, wherein the black ink composition contains at least one substance selected from the group consisting of the compounds expressed by formula (7) and the salts thereof as a colorant, and the total amount of the colorant is 0.5 to 12 wt % of the entire black ink composition.

28. The ink set according to claim 1, wherein the ink compositions contain a nonionic surfactant.

29. The ink set according to claim 28, wherein the nonionic surfactant is an acetylene glycol-based surfactant.

30. The ink set according to claim 28, wherein the ink compositions contain the nonionic surfactant in an amount of 0.1 to 5 wt %.

31. The ink set according to claim 1, wherein the ink compositions contain a penetrating agent.

32. The ink set according to claim 31, wherein the penetrating agent is glycol ethers.

33. An ink cartridge housing the ink set according to claim 1, integrally or separately.

34. An inkjet recording method for recording images comprising ejecting an ink set in the form of droplets onto a recording medium wherein the ink set is an ink set according to claim 1.

35. A recorded matter obtained by recorded with the ink set according to claim 1.

* * * * *